United States Patent
Smith

(10) Patent No.: US 11,384,886 B2
(45) Date of Patent: Jul. 12, 2022

(54) PULSATION DAMPENING SYSTEM FOR HIGH-PRESSURE FLUID LINES

(71) Applicant: Ronald E. Smith, Palmer, AK (US)

(72) Inventor: Ronald E. Smith, Palmer, AK (US)

(*) Notice: Subject to any disclaimer, the term of this patent is extended or adjusted under 35 U.S.C. 154(b) by 0 days.

(21) Appl. No.: 17/128,101

(22) Filed: Dec. 19, 2020

(65) Prior Publication Data
US 2021/0156504 A1    May 27, 2021

Related U.S. Application Data

(63) Continuation-in-part of application No. 16/747,521, filed on Jan. 20, 2020, now abandoned, which is a continuation of application No. 15/412,052, filed on Jan. 22, 2017, now Pat. No. 10,591,101.

(60) Provisional application No. 62/447,792, filed on Jan. 18, 2017, provisional application No. 62/298,459, filed on Feb. 23, 2016, provisional application No. 62/286,367, filed on Jan. 23, 2016.

(51) Int. Cl.
| F16L 55/053 | (2006.01) |
| F16L 55/04 | (2006.01) |
| F15B 1/04 | (2006.01) |
| E21B 43/26 | (2006.01) |

(52) U.S. Cl.
CPC .............. *F16L 55/053* (2013.01); *F15B 1/04* (2013.01); *F16L 55/041* (2013.01); *E21B 43/26* (2013.01)

(58) Field of Classification Search
CPC ......... F16L 55/053; F16L 55/041; F15B 1/04; E21B 43/26

USPC ...................................................... 138/31, 30
See application file for complete search history.

(56) References Cited

U.S. PATENT DOCUMENTS

| 3,044,481 | A | * | 7/1962 | Regan ..................... E21B 33/06 137/114 |
| 3,560,053 | A | * | 2/1971 | Ortloff .................. E21B 43/267 406/14 |
| 4,819,698 | A | * | 4/1989 | Ismert ................... F16L 55/053 138/26 |
| 4,880,257 | A | * | 11/1989 | Holbert, Jr. ............. E21B 17/06 285/2 |
| 6,123,525 | A | * | 9/2000 | Burns ................. F04B 11/0016 303/87 |
| 6,547,541 | B1 | * | 4/2003 | Nishio .................... F04B 43/08 417/472 |
| 7,278,496 | B2 | * | 10/2007 | Leuchtenberg ......... E21B 21/08 175/48 |

(Continued)

*Primary Examiner* — Craig M Schneider
*Assistant Examiner* — David R Deal
(74) *Attorney, Agent, or Firm* — Sherman D. Pernia

(57) ABSTRACT

Disclosed is a pulsation dampening system for high-pressure (e.g., 10K psi and higher) fluid lines. At high fluid flow pressures, the dampening system is a dual stage dampening system, responsive to low (e.g., when first charging the fluid line) and to very high-pressure pulsations. An external containment shell handles the full fluid flow pressures. One or more internal shells contain and handle the internal gas dampening system. The in-flow relationship of the gas dampening component assures that pressure differences between the internal gas handling system and the high-pressure fluid flow is always relatively small. This enables the gas handling components to be constructed of less robust material than the external shell (even though the gas system's internal pressure can equal that of the fluid flow), and be less susceptible to pressure failure.

7 Claims, 19 Drawing Sheets

(56) References Cited

U.S. PATENT DOCUMENTS

| | | | | |
|---|---|---|---|---|
| 8,267,123 B2* | 9/2012 | LeBlanc | ............... | F15B 1/24 |
| | | | | 138/31 |
| 8,485,220 B2* | 7/2013 | Riano Gutierrez | .. | G05D 7/0133 |
| | | | | 137/517 |
| 8,899,940 B2* | 12/2014 | Leugemors | ............ | F04B 43/02 |
| | | | | 417/53 |
| 9,234,334 B2* | 1/2016 | Field | ..................... | E03B 5/00 |
| 2010/0040483 A1* | 2/2010 | Berger | ................ | G01N 30/32 |
| | | | | 417/205 |
| 2012/0211112 A1* | 8/2012 | Barth | ................ | F16H 61/4096 |
| | | | | 138/30 |

\* cited by examiner

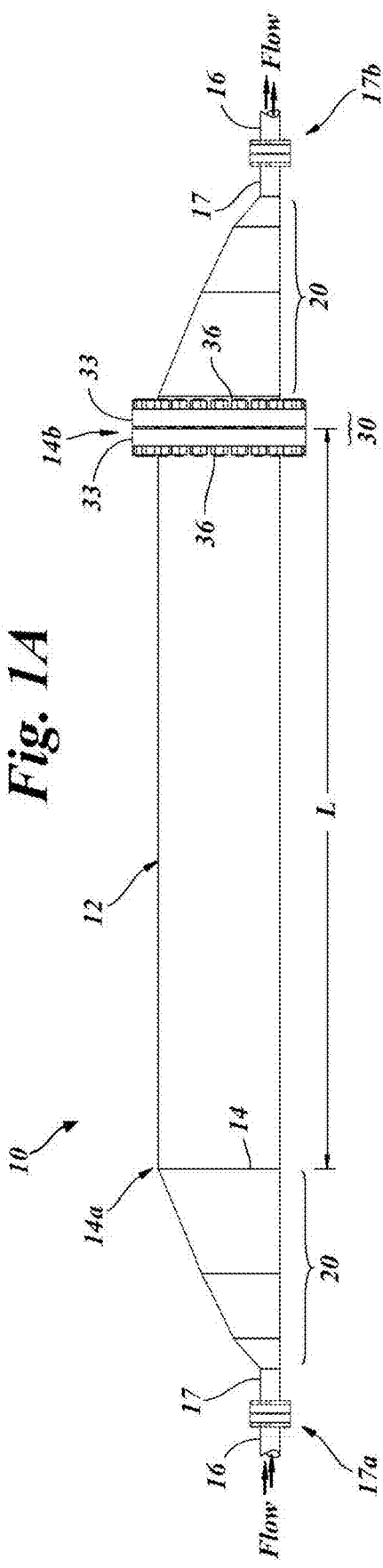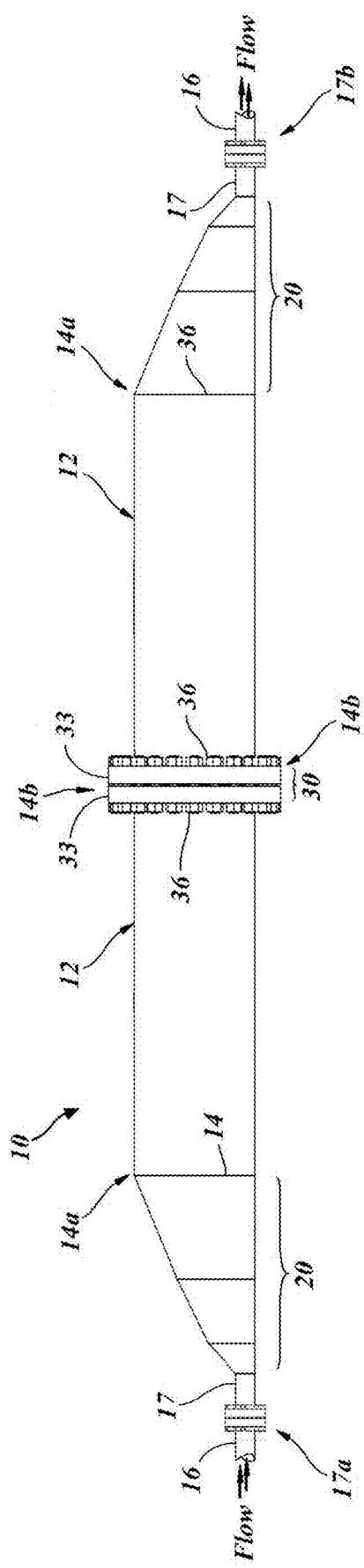

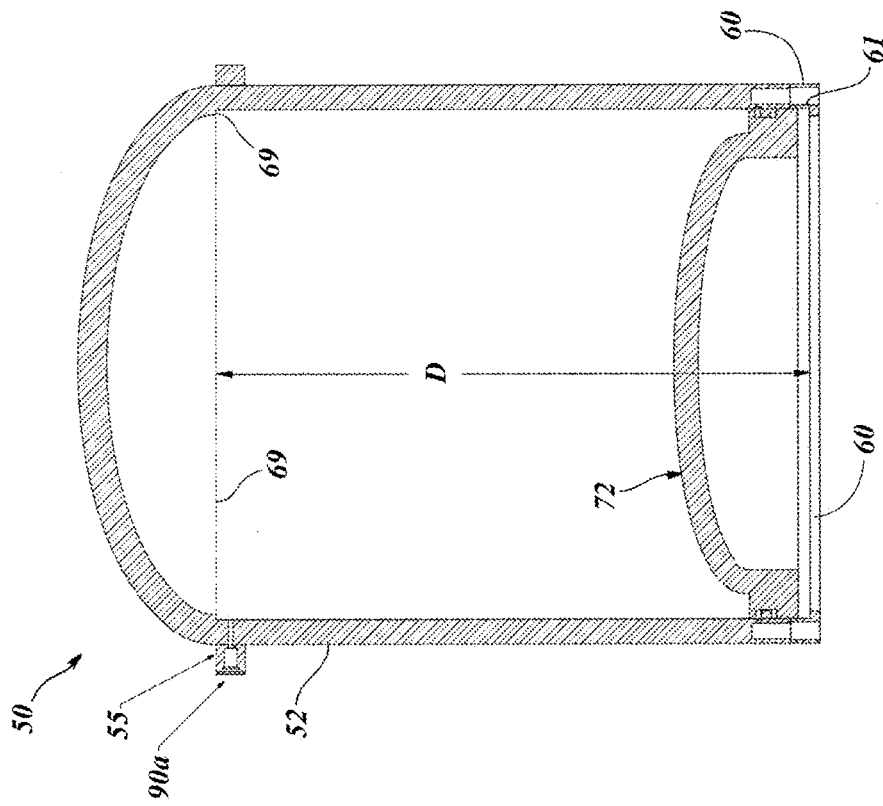
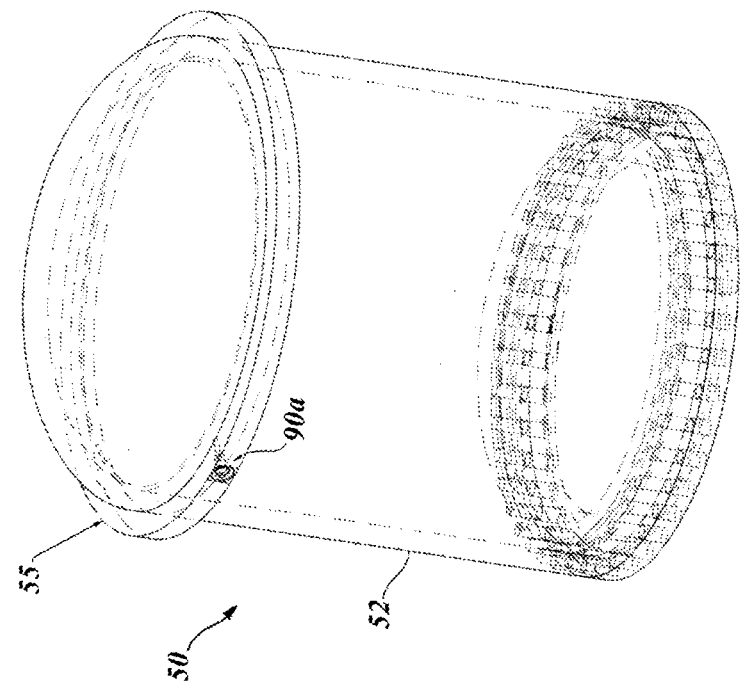
*Fig. 6B*
*Fig. 6A*

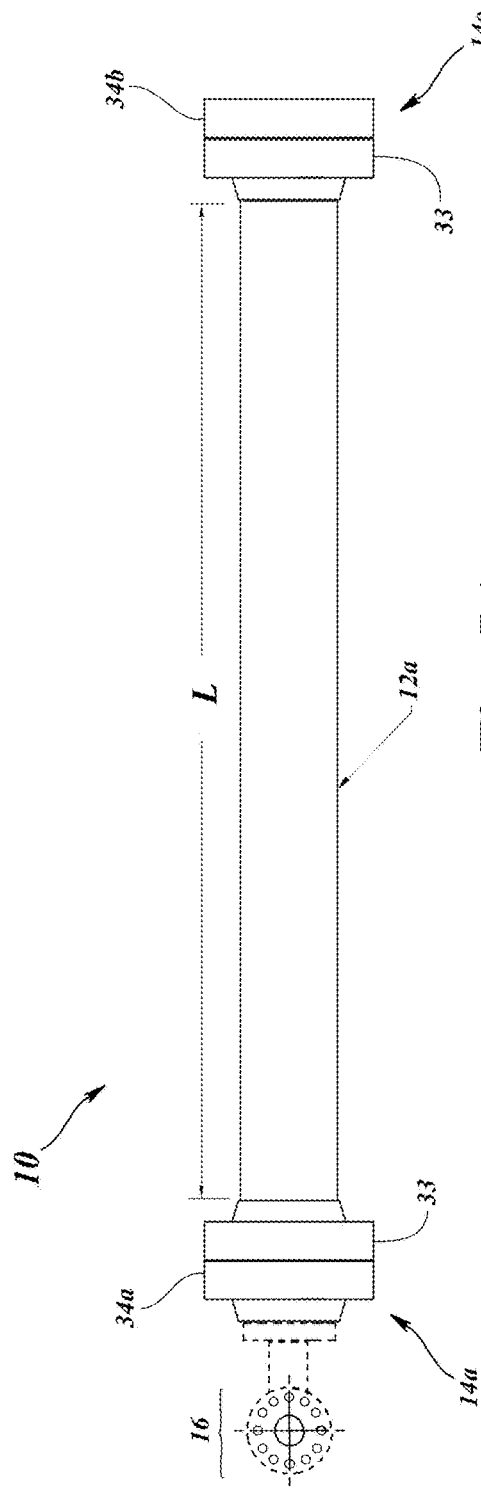
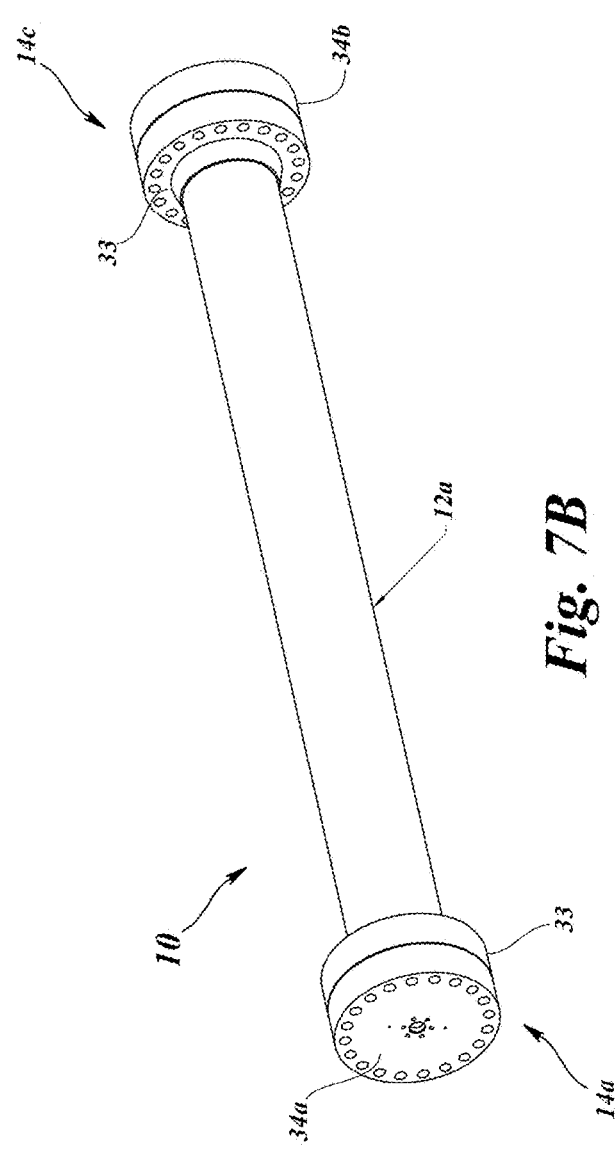
Fig. 7A
Fig. 7B

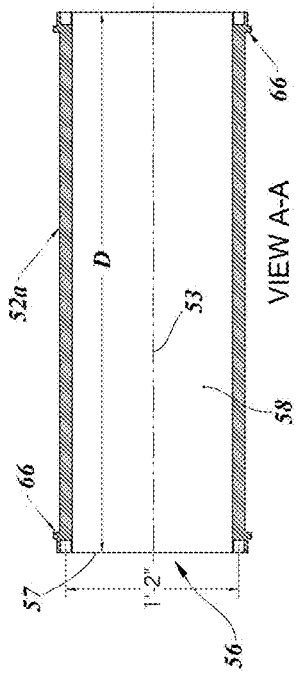
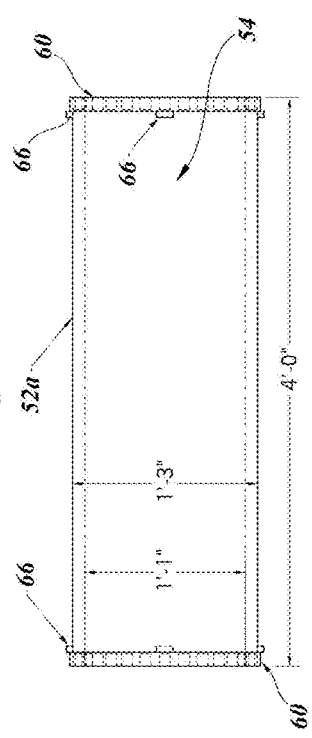
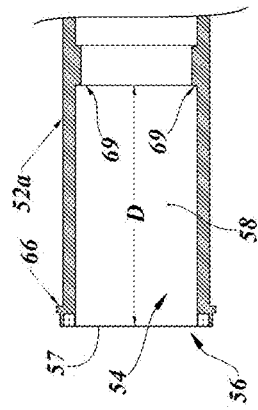
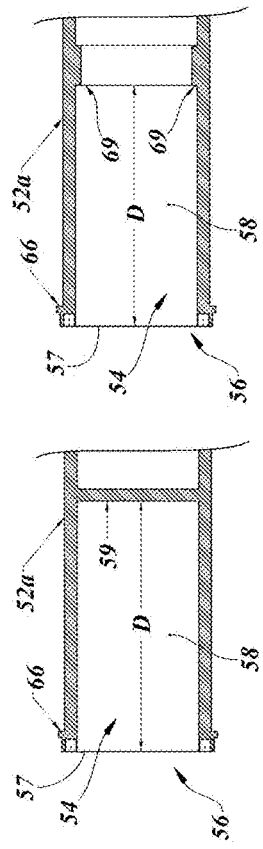
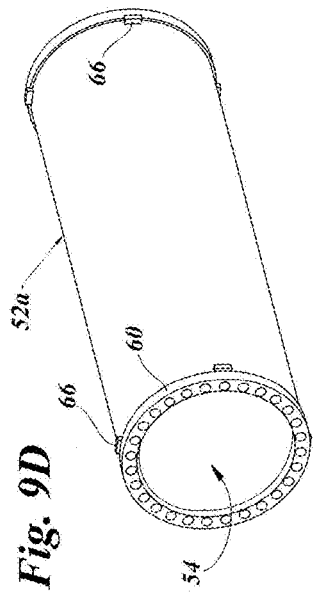
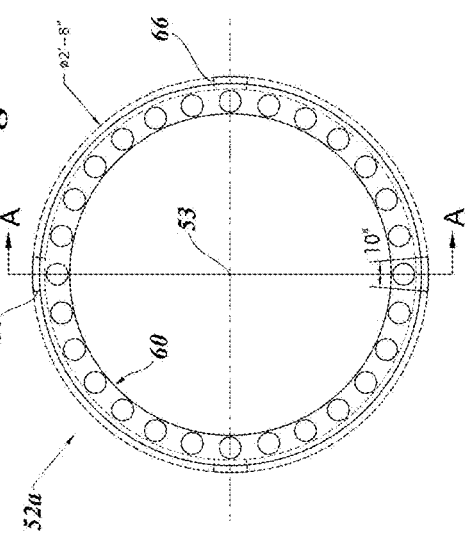

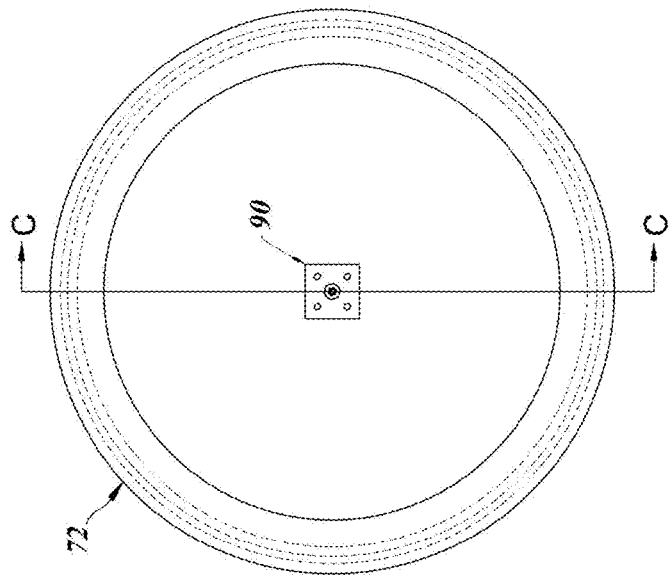
Fig. 10C
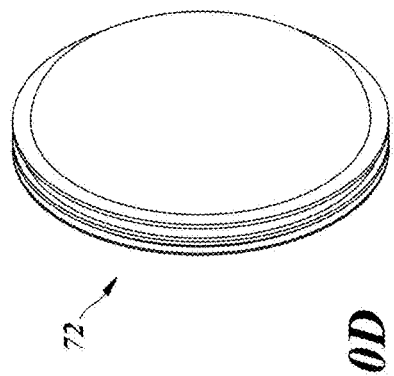
Fig. 10D
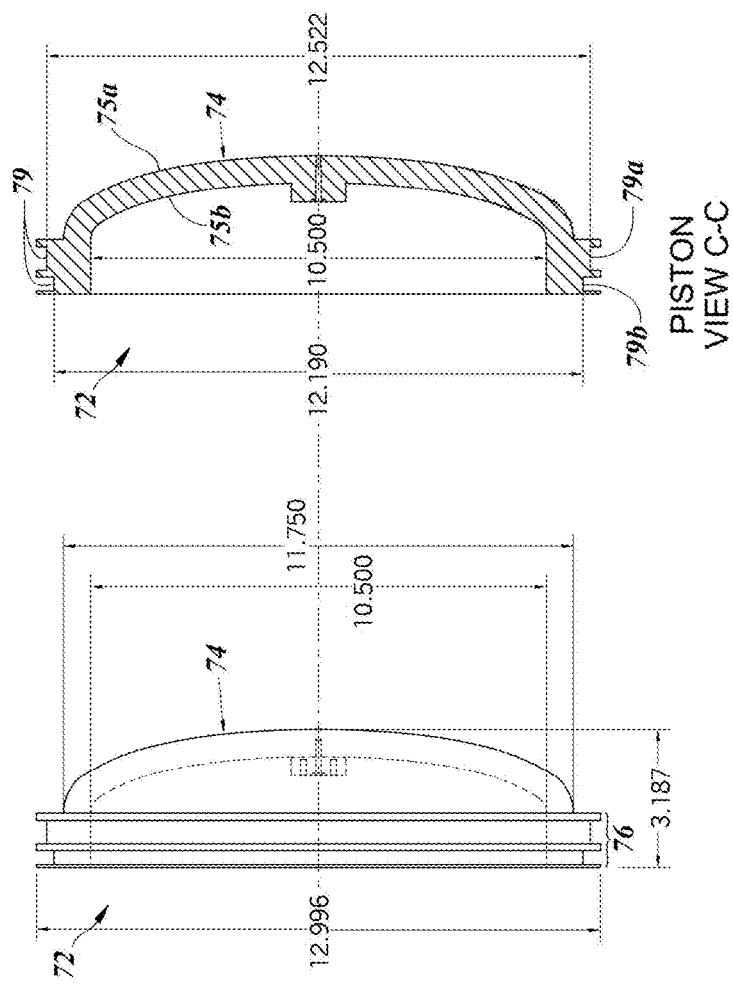
Fig. 10B
Fig. 10A

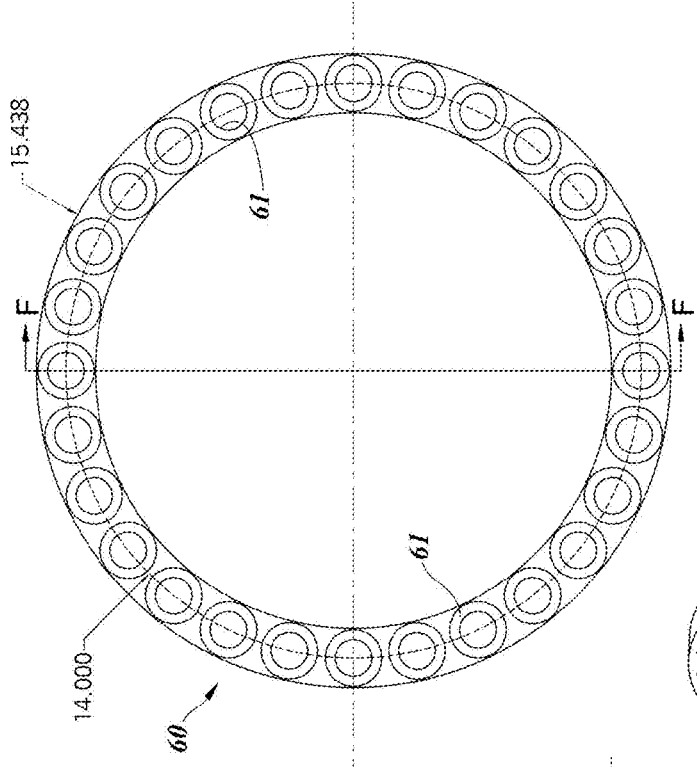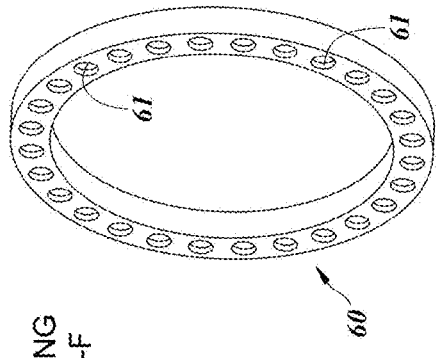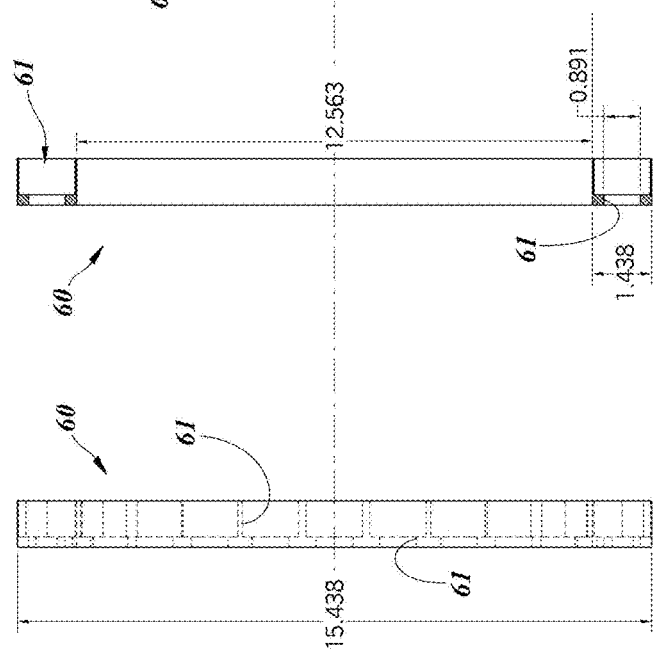

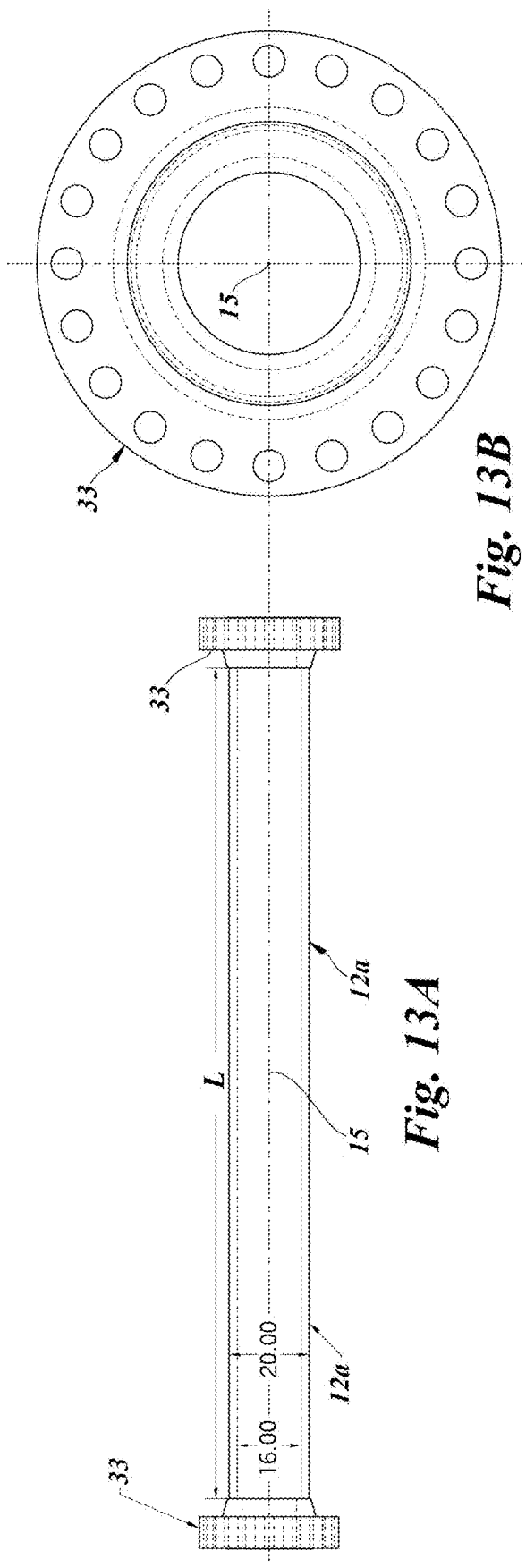
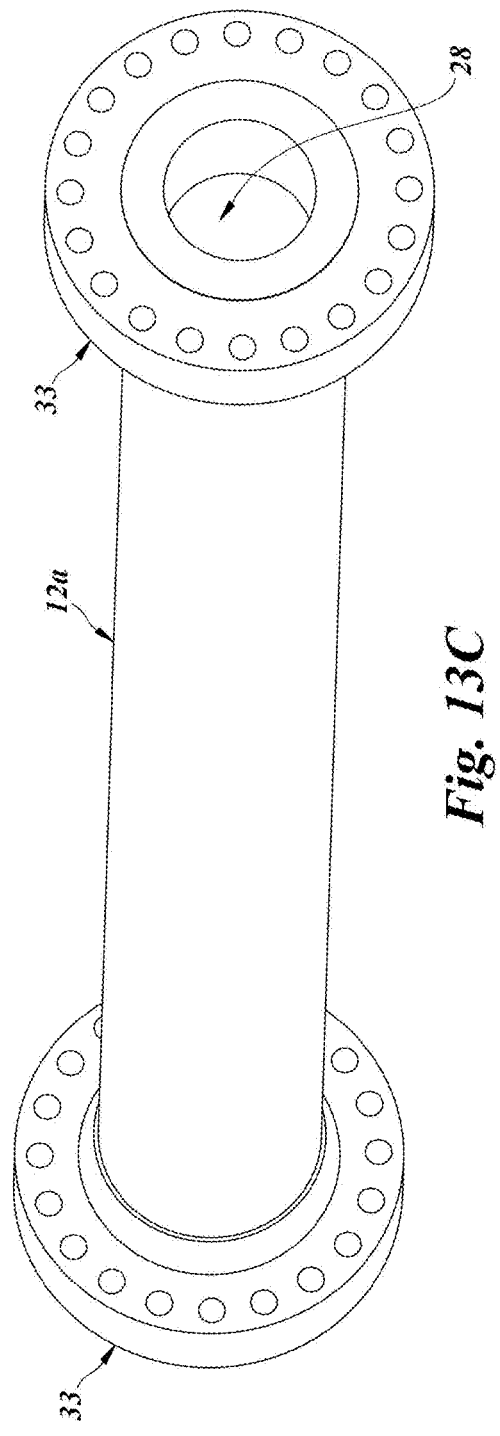
Fig. 13A
Fig. 13B
Fig. 13C

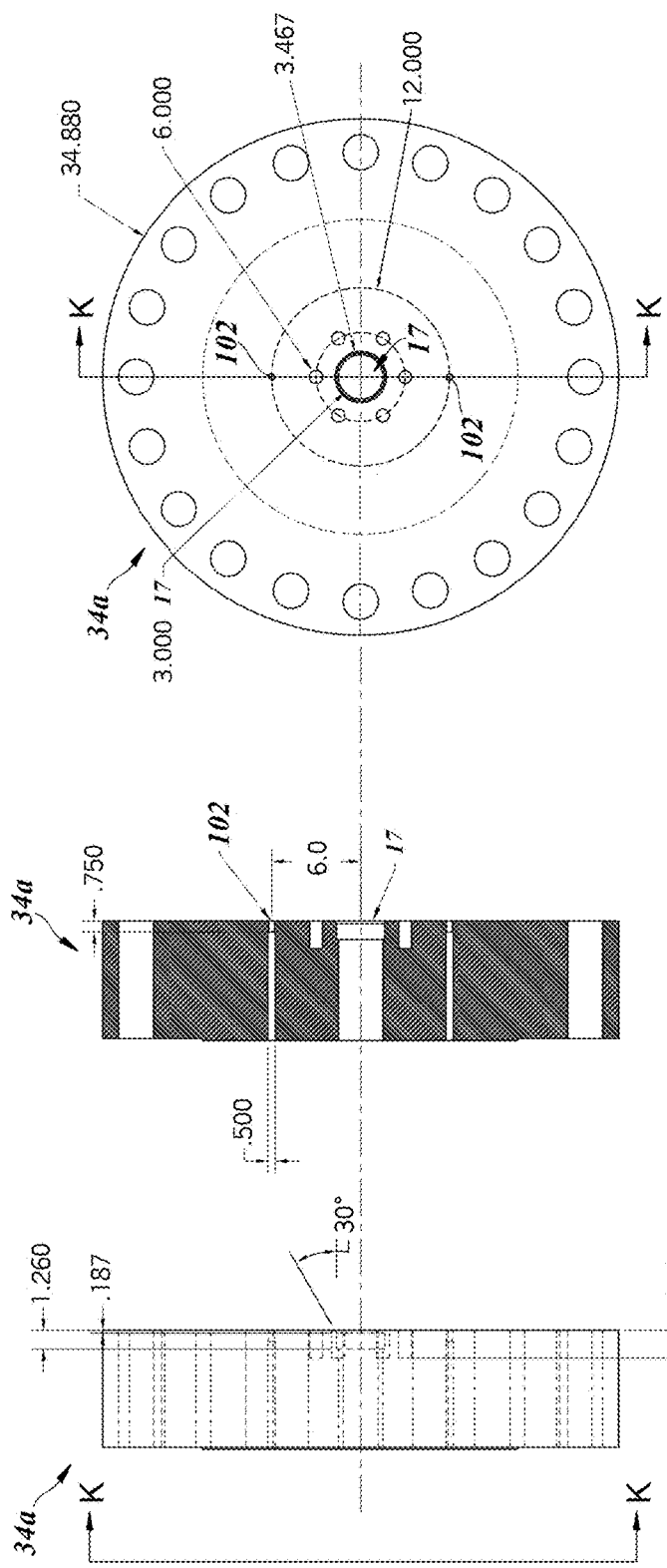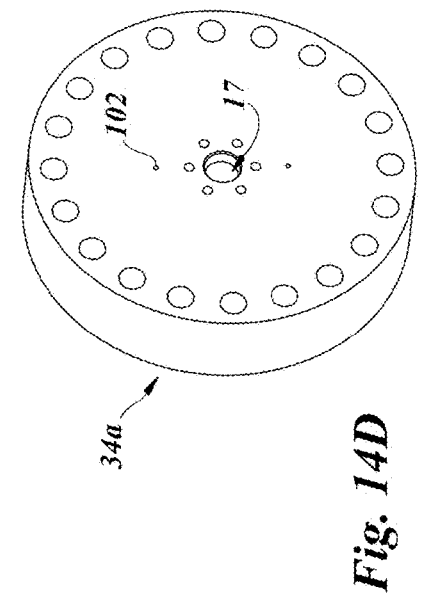
Fig. 14C
Fig. 14B
Fig. 14D
Fig. 14A

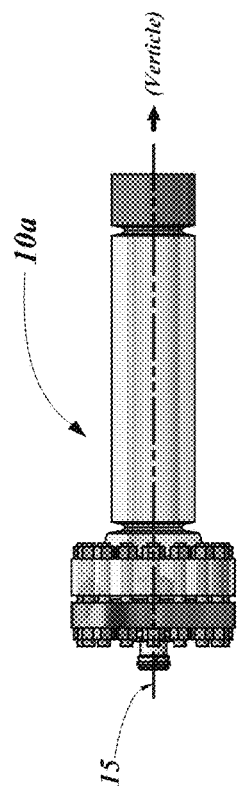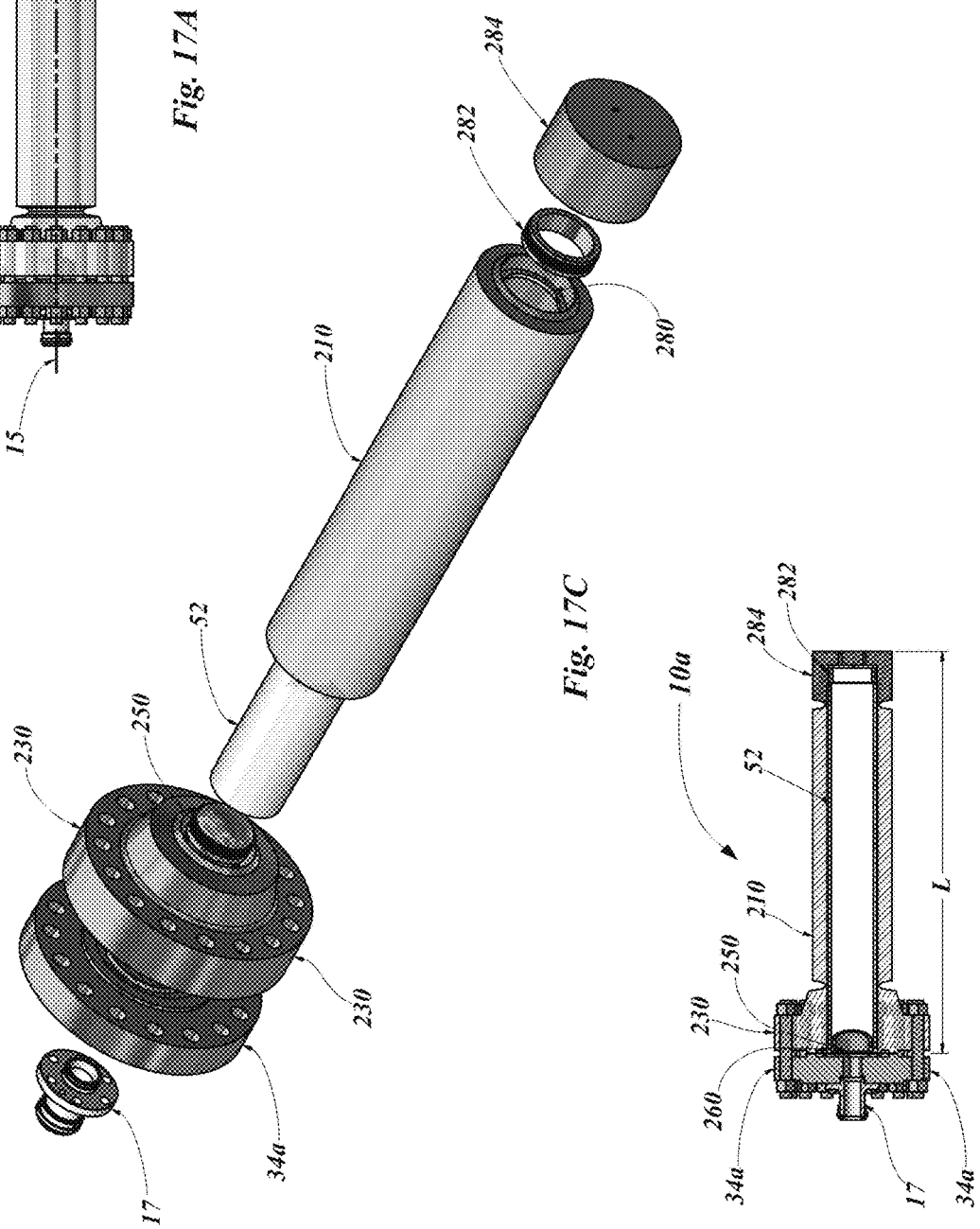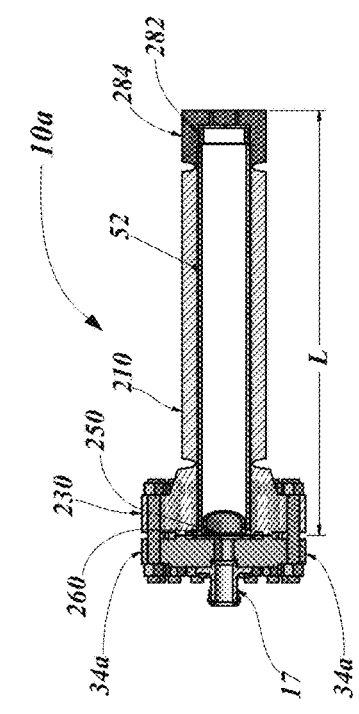

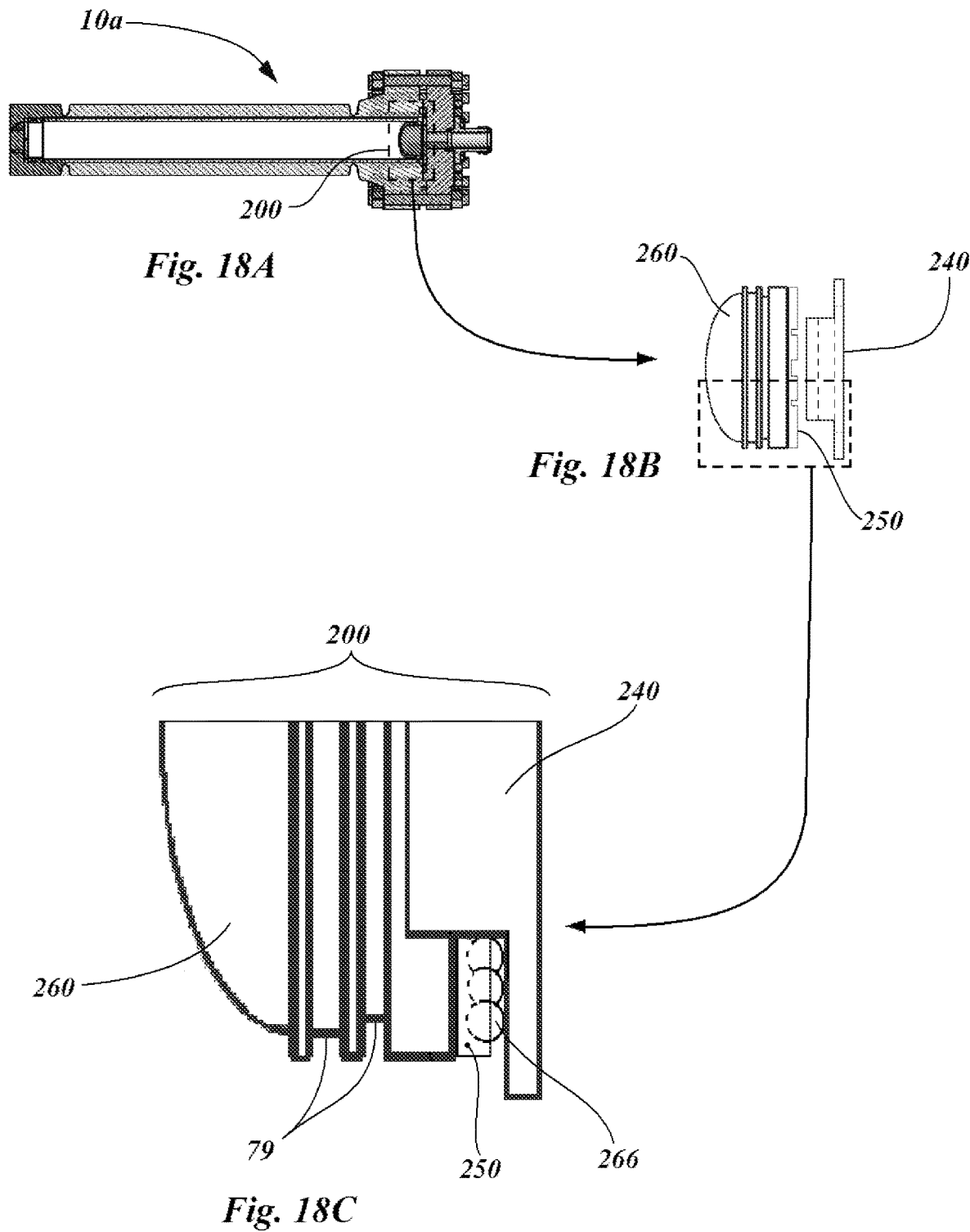

PULSATION DAMPENING SYSTEM FOR HIGH-PRESSURE FLUID LINES

CONTINUITY DATA

The present application claims the benefit of prior filed U.S. Provisional Patent Applications: Ser. No. 62/447,792 filed 18 Jan. 2017, Ser. No. 62/298,459 filed 23 Feb. 2016, and Ser. No. 62/286,367 filed 23 Jan. 2016; and prior filed Non-Provisional application Ser. No. 15/412,052 filed 22 Jan. 2017 (pending) to which prior applications the present application is a U.S. Non-Provisional Application, and which prior applications are incorporated herein by reference.

FIELD OF THE INVENTION

The present invention is in the field of pipes and tubular conduits, including internal structures and end structures of the tubular member, and having fluid pressure compensators, e.g., accumulators or cushioning devices (Class 138). Specifically, the present invention relate to devices with pressure compensators attachable to a pipeline for dampening pulsations in pressure caused by a quick-shutoff of flow or by the non-uniform action of a pump system to maintain a more nearly constant pressure of the fluid (subclass 26). More specifically, the present invention relates to such devices having variable chambers (subclass 30), in which the chamber is of variable capacity by reason of a slideable piston or plunger (subclass 31).

BACKGROUND OF THE INVENTION

An example use case for the present invention is in the field of high-pressure hydraulic fracturing (aka: "fracing"), as used in the oil production industry. Fracing includes the use of high-pressure, positive displacement, pulsing pumps to deliver suspended sand fracing fluids to subsurface areas containing oil deposits. The fracing process cracks the formation where oil resides and places sand in the fractures for improved oil flow and volume to the wellbore.

Although utilizing the fracing process increases the cost of production for a well using it, the process can substantially increase the efficiency of the well's production. In times of high oil prices, the increase of production efficiency exceeds the cost of the fracing process. Demand for fracing, along with horizontal drilling spurred a boom in US oil and natural gas production. However, in times of low oil prices, the increase in production efficiency does not offset the cost of the fracing process for the well, and low producing wells are shut-in, rather than initiating a fracing operation. Even the largest hydraulic fracturing operations in the US have been forced to dramatically cut costs in response to reduced demand for services. With oil companies cutting and expecting to continue to cut more than 100 billion dollars in spending globally, fracing expenditures are expected to concomitantly fall as much as 35%. It has been reported that about half of the hydraulic fracturing companies operating in the US would be closed or sold by year-end 2015, because of falling oil prices and reduced oil company expenditure.

With a continuing poor outlook for a significant increase in oil prices in near and mid-term future, solutions for reducing production expenses, including fracing costs, are expected to be a continued critical focus. One critically high cost common in the fracing industry is related to equipment failures, caused by the high-pressure, pulsating flow into the fracing piping. The high-pressure, pulsating flow results from the massive positive displacement pumps used to pump the fracing fluids into the fracing piping. The pressure pulses slam the couplings, joints and fittings of the piping with thousands of pounds of force three hundred (300) times per minute causing failure of these fittings. Replacement of high-pressure fracing equipment is very expensive. Failed fracing fixtures and pipe also results in costly downtime required to resource and replace failed components before the production process can continue. Pumps, piping, fittings, and valves are all adversely affected by the very high-pressure pulses from the massive positive displacement fracing pump systems. The industry has long been in search of meaningful solutions to the fracing iron failure problem. It would be seriously beneficial to the oil production industry, and hydraulic fracturing services specifically, if a means for reducing fracing costs could finally be provided with a solution.

However, there are serious barriers to safe and successful implementation pulsation dampening on high-pressure pulsatile flow lines. One major barrier is to the use of "gas-cushioning" in pulsation dampeners. This is because in high-pressure applications (e.g., pressures on the order of 20,000 psig), the very highly compressed gas can present a very real explosion threat and potential injury to nearby persons and equipment. Another barrier that has long prevented the application of "gas-cushioning" in pulsation dampeners is the limitations of gas-seals in the dampener apparatus to withstand and be proof against the high $\Delta_p$ (pressure differentials) typical of high-pressure pulsatile flow systems. Also, in "gas-cushioning" type pulsation dampeners with moving interfaces (e.g., a sliding piston) the pressure differentials across barriers (e.g., walls) separating liquid and gaseous spaces can be distorted or caused to balloon under the pressure differences. This is a serious problem for maintaining liquid/gas seal integrity at a dampener's moving/sliding interfaces.

REFERENCE NUMERALS

D Depth of the interior wall
L Length of Dampener housing
10 & 10a Pressure pulsation dampener
12 Dampener housing
14 Dampener housing end
14a Dampener housing 1st end
14b Dampener housing 2nd end
15 Dampener housing axis
16 High-pressure fluid flow line
17 Fluid I/O port
17a Fluid inlet port
17b Fluid outlet port
20 Housing-to-flow line adapter
22 Fluid flow thru-path
24 Non-flow fluid chamber
26 Liquid communication means
28 Dampener housing fluid space
30 Union
33 Union flange member
34 (a&b) Union flange member
36 Flange fasteners
50 Damper canister
52 Canister housing
53 Canister housing axis
54 Canister interior space
55 Canister flange
56 Canister opening
57 Canister rim 58 Canister interior wall
59 Canister interior bulkhead
60 Piston stop ring
61 Fastener aperture
62 Stop ring fasteners
64 Through-flow spacer ring
66 Radius stand-off
68 Ring fluid port
69 Canister piston stop shoulder
70 Damper piston assembly
72 Damper piston
74 Damper piston head
75a Piston gas pressure surface
75b Piston fluid pressure surface
76 Damper piston skirt
79 Piston ring channel
82 Wiper ring
90 Gas port fitting
92 Gas port
94 Gas valve
96 Gas port cover
102 Canister gas port
200 Sediment management system
210 Dampener housing
230 Housing flange
240 Stop ring
242 Piston stop face
244 Canister mounting face
246 Canister support lug
248 Spacer tab
250 sediment management ring
252 Fastener port
253 Stop point-contact cover
254 Point-contact port
255 Sediment notch
260 Damper piston assembly
261 Sediment ring interface
262 Fastener receiver
264 Stop point-contact receiver
280 Compression sleeve
282 Canister seal ring
284 End cap

SUMMARY OF THE INVENTION

Pulsations from high-pressure, massive positive displacement can only effectively be controlled through the use of gas to provide dampening or "cushioning". The use of high-pressure gas presents safety and design challenges. Gases under extreme high-pressure are, by their nature, explosive. Control of gases at pressures in excess of three thousand (3,000) psig requires extremely heavy wall containers and massive flanges, when contained using conventional material. This invention manages both the safety and the heavy wall concerns to present a safe and manageable solution to the requirement for pulsation reduction in high-pressure systems.

Prior art pulsation dampeners typically have a gas bladder design. These prior art dampeners are generally low volume gas due to their limited pressure of 3,000 psig or below. Higher pressures require higher volumes of compressed gas due to the significantly reduced space as the gas is compressed for pulsation control service. Obviously, as the pressure increases with the resultant increase in high-pressure gas volume, safety concerns dominate. This concern eliminates the use of single volume bladders. Until this invention, high-pressure dampeners were not available, as companies would not allow such equipment in vibration service. Additionally, the size and weight of these high volume dampeners has limited their use.

As stated, the typical single gas volume (bladder) has been the basis for pulsation control for prior art at much lower pressures. This invention embodies a new approach to the large gas volume by segmenting the large gas volume into discrete, single volumes of gas enclosed in cylinders. These cylinders are equipped with pistons and the pistons move vertically to compress the gas above and within the cylinder. The gas-containing, piston-driven cylinders are then placed internally along the pulsation dampener housing. The pulsation dampener housing is designed to withstand full hydraulic pressure of the process.

The pulsation dampener housing is designed with eccentric reducers gradually increasing housing diameter from the flow piping to a large diameter pulsation dampener housing where the gas cylinders reside. The pulsation dampener housing is flanged for easy removal, inspection and replacement of the pressure cylinders from the pulsation dampener housing. The gas cylinders are placed in the pulsation dampener housing in such a manner that the process fluid passes directly below every canister as the flow enters, flows through and then exits the dampener.

At the initiation of the process, the spaces around the sealed gas canisters become fluid-packed. After the dampener becomes fluid-packed, flow continues below the gas cylinders as designed. At that point, pressure pulses from the massive positive displacement pumps are transferred to all portions of the pulsation dampener housing and all external surfaces of the gas cylinders. Since the gas cylinders are preloaded with gas to 4,000 psig, as the external pressure increases on the gas cylinders, the differential pressure across the gas cylinder housing decreases, further reducing any threats of cylinder damage and gas release. As the gas pressure equalizes at 4000 psig and then continues to increase, the gas cylinder piston lifts due to the pressure differential across the piston. However, the pressure differential across the cylinder housing is now zero with full containment of the gas within the cylinder. The pulsation dampener housing is exposed only to the hydraulic pressure, while the gas is secondarily contained in stress-free gas cylinders. Further increases in pressure result in increased hydraulic pressure to the pulsation dampener housing only. These further pressure increases in the system and on the gas cylinders only serve to lift the gas cylinder pistons to maintain an internal pressure equal to the external pressure to the cylinders. Therefore, the internal gas cylinder/canister walls need only be proofed to the preloaded pressure of the gas cylinder/canister, as the pressure difference across its walls substantially never exceeds the preload gas pressure.

As the high-pressure positive displacement pumps reach the required system pressure, high-pressure, equipment-damaging pulses initiate. As each pressure pulse from the reciprocating pistons of the positive displacement pumps enter the pulsation dampener, the increase in dampener housing pressure form the pulse causes the gas cylinder pistons to react and rise, dampening the pulse and reducing it to manageable magnitudes in the dampener. The magnitude of the pulse is dampened and the fluid flow through the dampener continues under the pistons as designed. The pulses are effectively dampened by the action of the piston movement to absorb the pulse in the gas volumes of the gas cylinders. During operation, the maximum pressure across the gas cylinder/canister walls typically is around 250 psig, while the cylinders remove up to 3,000 psig pressure magnitude of the pulses during operation. The very low pressure of 250 psig offers little threat to the structural integrity of cylinders designed to withstand the preload gas pressure. During the high-pressure pumping process, the damper canister housing is only exposed to a much safer lower hydraulic pressure. After the high-pressure process completes, the hydraulic pressure is relieved from the dampener housing. At that point, the gas cylinder pistons return to their original position at the start of the high-pressure process.

Suspended solids in a fluid suspension need to be manage due to sediment formation which can lead to plugging and fouling. The present invention manages suspended solids in a couple ways. One is a damper piston system incorporating a design that promotes high velocity eddies at the base of the piston such that sedimentation solids do not accumulate and simply pass from the apparatus with little. In this case, special wiper seals can be used to protect the piston seals during operation. The small amounts of solids infiltrating the dampener housing during the initial process of filling of the dampener with fluid simply settle out into the flow stream. In an additional process, sediment management is further facilitated by a piston system that breaks up sediment plaques as the piston engages them.

The apparatus is best practiced using high yield strength, hardened stainless steel using appropriate welding processes to reduce the required wall thickness for the pulsation dampener housing. The hardened stainless steel provides both excellent erosion (suspended solids) and corrosion resistance for improved and extended equipment life for the dampener and gas cylinders.

In a one embodiment of the apparatus, the damper canister gas space is filled through a single aperture in the piston, which also houses a one-way check valve allowing the gas to flow into the gas cylinder but restricting flow from the gas cylinder. The check valve is not a perfect seal, such that a gas inlet seal system is employed to assure no decrease in pressure prior to deployment. The check valve leakage also provides a method for depressurizing the cylinder. Depressurizing the gas cylinder is accomplished by removing the gas inlet seal, and allowing the to leak down through the check valve. In another embodiment, the damper canister gas space is filled through the upper end of the canister housing.

This invention is designed to safely utilize pressurized gas to compensate the pressure pulsations generated in high-pressure fluids pumped from sources such as positive displacement pumps.

BRIEF DESCRIPTION OF THE DRAWINGS

FIG. 1A is a side elevation schematic view of a preferred embodiment of the present high-pressure flow pulsation dampener.

FIG. 1B is a schematic perspective view of a series of high-pressure flow pulsation dampeners of the present invention.

FIGS. 6A & 6B are: (A) a partial phantom perspective view of a damper canister, and (B) a cross-sectional view of a damper canister showing an alternative disposition of the gas port fitting.

FIG. 7A & FIG. 7B are: (A) a side elevation view, and a perspective view of an alternative embodiment of the present high-pressure flow pulsation dampener apparatus.

FIGS. 9A-9D are views of the canister housing of the tandem damper canister for practice in the present apparatus.

FIGS. 10A-10D are various views of a damper piston for use in the present apparatus.

FIGS. 11A-11D are various view of a stop ring for practice in the present apparatus.

FIGS. 13A-13C are various view of a canister housing for practice with tandem damper canisters in the present apparatus.

FIGS. 14A-14D are various view of an inlet port type union flange for practice in the present apparatus.

FIGS. 17A-17C are: (A) a plan view of a pulsation dampener device; (B) a cross-sectional view through plane A of the device of FIG. 17A; and (C) an exploded perspective view of the device of FIG. 17A.

FIGS. 18A-18C are a series of phantom drawings focusing in on the location of a sediment management system as practiced in the pulsation dampener device of FIG. 17A.

DESCRIPTION OF THE INVENTION

Figure 2A:
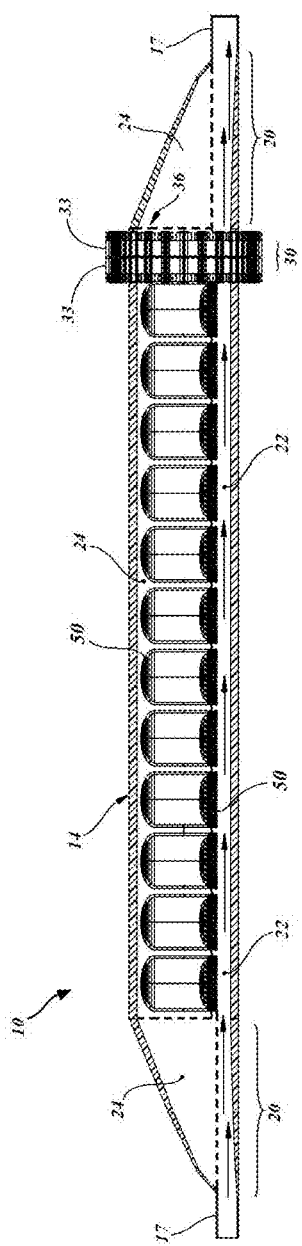
FIG. 2A is a side elevation cross-sectional schematic view of the high-pressure flow pulsation dampener of FIG. 1A.

Referring now to the drawings, the details of preferred embodiments of the present invention are graphically and schematically illustrated. Like elements in the drawings are represented by like numbers, and any similar elements are represented by like numbers with a different lower case letter suffix.

The present pulsation dampener apparatus 10 is disclosed for use in a Hydraulic Fracturing ("frac" or "fracing") process. In use in a fracing process, the pulsation dampener apparatus 10 is installed inline with the flow of the fracing fluid, and acts to dampen pressure pulses in the high-pressure fluid flow in the fracing fluid line 16. However, it is to be noted that although the embodiments set forth herein use the fracing process as an example of a pumping system utilizing high-pressure, pulsatile fluid flow, the present apparatus can be practiced with substantially any such high-pressure, pulsatile fluid flow system to dampen high-pressure pulsations . . . especially in such system utilizing fluid suspensions and having abrasive properties. It is important to note that the exemplified fracing fluids process operates at flow rates and line pressures using highly abrasive liquid suspensions that can be corrosive as well. Line pressures on the order of 12,000 psi and flow rates of over 30 mph are not unusual, all of which is intended in the present invention. In major part, the pulsation dampener apparatus 10 includes: a dampener housing 12; a series of damper canisters 50 internally disposed inside the dampener housing 12; and interfaces and adaptors for connecting the dampener 10 to a fluid flow line 16.

Figure 2B:
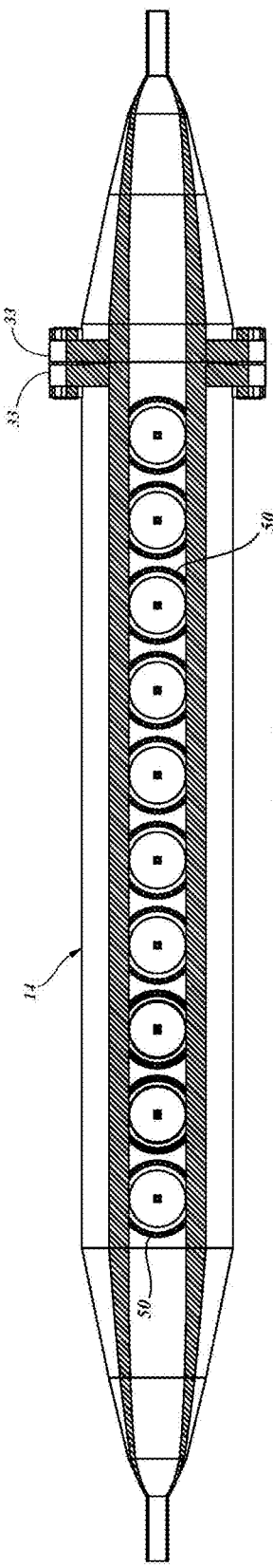
FIG. 2B is a bottom plan partial cut-away view of the high-pressure flow pulsation dampener of FIG. 1A.
Figure 2C:
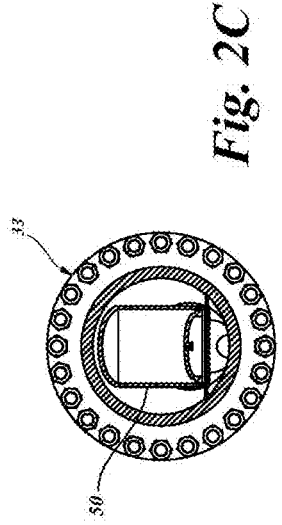
FIG. 2C is an end-on cross-sectional schematic view of the high-pressure flow pulsation dampener of FIG. 1A.

In the embodiments illustrated in FIG. 1A and FIG. 2, the dampener housing 12 of the pulsation dampener apparatus 10 is an elongated pipe having two ends 14, with first-end 14a shown as being directly connected (by welding) to a housing-to-flow line adapter 20, and a second-end 14b shown as being directly connected (by welding) to a union interface 30. In the preferred embodiment illustrated, the high-pressure components, such as the dampener housing 12, are anticipated as being made of martensitic steel (e.g., SS-420). However, high-pressure metal/steel component fabrications currently available in the field may also be used for practicing the present invention FIGS. 2A-2C show internal structure of a dampener housing 12, which includes a fluid flow thru-path 22 and a non-flow fluid chamber(s) 24, both of which are disposed along the length L of the dampener housing 12. Inside the pulsation dampener apparatus 10, and specifically inside the dampener housing 12, the fluid flow thru-path 22 and the non-flow fluid chamber(s) 24 are in liquid communication with each other. The liquid communication means 26 is adapted and disposed so that the flow rate of the fracing fluid in the fracing fluid line 16 is not substantially impacted. This is accomplished by having as close to the minimal actual fluid transfer as possible between the fluid flow thru-path 22 and the non-flow fluid chamber(s) 24. The minimal actual fluid transfer is that amount necessary to enable any gas trapped in the dampener housing 12 to be dissolved and eventually carried away. This setup also is adapted to allow the fluid pressure of the fluid flow thru-path 22 to be fully communicated the fluid in the non-flow fluid chamber(s) 24. This is an important feature of the present invention, as it directly impacts a safety benefit of the present invention, as will be explained below. The liquid communication means 26 in the embodiments illustrated is simply a plurality of through-holes in the structure or wall separating portions of the fluid flow thru-path 22 and the non-flow fluid chamber(s) 24.

A housing-to-flow line adapter 20 is used to adaptively connect one or both ends 14 of the dampener housing 12 to a high-pressure fluid flow line 16 at the inlet port (pump side) 17a of the high-pressure fluid flow line 16 or the outlet port (down-hole side) 17b. As with the dampener housing 12, the housing-to-flow line adapter 20 is also designed to so that the flow rate of the fluid in the high-pressure fluid line 16 is not substantially impacted.

The series of damper canisters 50 internally disposed inside the dampener housing 12 are the heart of the present high-pressure pulsation dampener apparatus 10. The series of damper canisters 50 is internally disposed in the non-flow fluid chamber 24 of the dampener housing 12. Each damper canister 50 has its upper portion immersed in the fluid (and fluid pressure) of the non-flow fluid chamber 24. However, the bottom of each canister 50 is disposed so that it is exposed to the pressure and fluid flow of the thru-path 22.

Because the canister bottoms are in pressure communication with the fluid flow thru-path 22, each damper canister 50 is disposed to dampen a portion of a pressure change of the fluid in the fluid flow thru-path 22. Additionally, because the canisters are initially gas pressurized from about 2,500 to 5,000 psi, the series of canisters 50 in the housing 12 distribute the risk of a catastrophic failure of the pressure dampening system over the total number of pressure vessels (damper canister). This greatly reduces or eliminates the risk of a catastrophic failure event from the failure of a single pressure vessel.

Union interfaces 30 are designed and used to accomplish unions in the present invention in a number of situations. For example, union interfaces 30 can be used to join an end 14 of a dampener housing 12 to a housing-to-flow line adapter 20 (see FIG. 1A and FIG. 2), or to an end 14 of another dampener housing 12 (see FIG. 1B). A union interface 30 has a flange member 33 connectable to another flange member 33 (e.g., on the housing-to-flow line adapter 20), using flange fasteners 36.

Figure 3B:
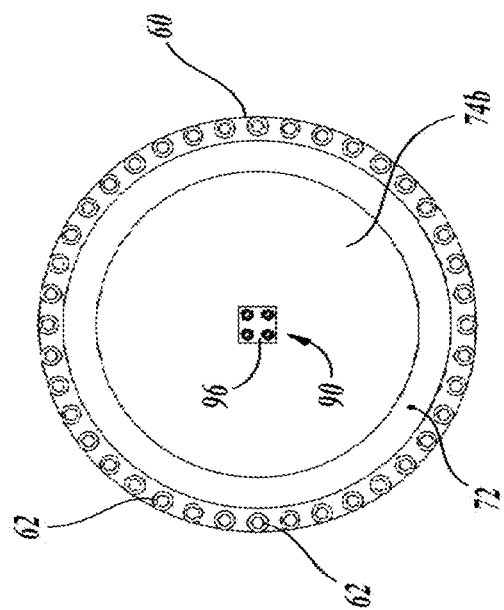
FIGS. 3A and 3B are: (A) a side elevation schematic view and (B) a bottom plan view of a damper canister of the present high-pressure flow pulsation dampener.
Figure 3A:
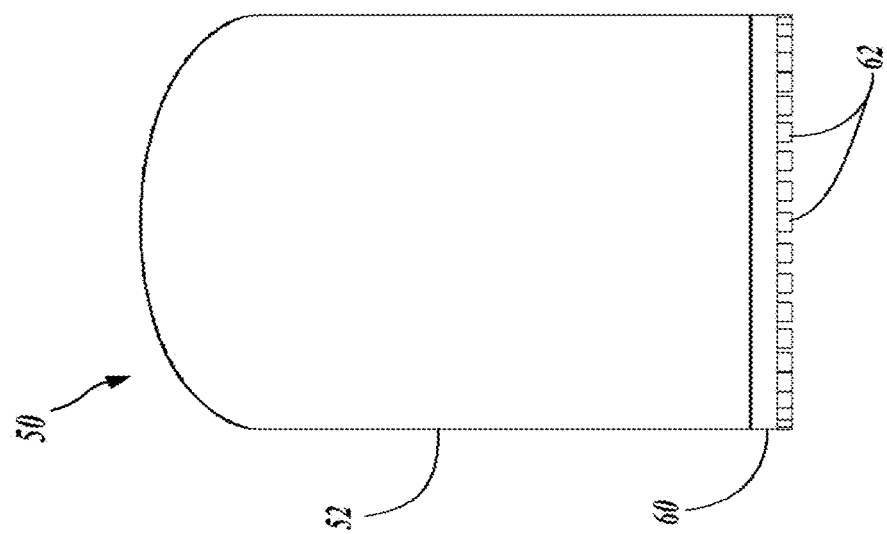

The damper canisters 50 are intended for use in the present pulsation dampener apparatus 10 as a plurality of damper canisters 50 in series. See FIG. 2. It is the series of damper canisters 50 that cumulatively accomplish the dampening of the fluid pressure pulses in a high-pressure fluid flow line 16. That is to say that the amplitude of fluid pressure pulses at the fluid outlet port 17b is lower than at the fluid inlet port 17a. In the embodiments illustrated, the damper canisters 50 in the depicted series are all substantially identical in structure, operational specifications and function. However, they do not have to be, and there are situations in which the series may not consist of a homogeneous set of damper canisters 50. For example, an initial gas charge in some canisters may be lower than for other canisters in the series set, to accomplish a more gradual onset of damping action upon startup and initial fluid charging of the damper apparatus 10. An assembled damper canister 50 is disposed to withstand an operating environment having varying gas and fluid pressures up to 12,500 psi. The major components of the damper canisters 50 are all similar. Each damper canister 50 (FIGS. 3A & 3B) has a canister housing 52, a damper piston assembly 70, a piston stop ring 60, and a gas port fitting 90, as illustrated in FIGS. 4 & 5 and FIGS. 6A & 6B.

The canister housing 52 is in the form of a high-pressure gas cylinder, open at one end. The canister housing 52 has a housing interior space 54 and a cross-sectional housing opening 56 at the one open end. The interior wall 58 of the canister housing 52 is adapted to closely receive a piston assembly 70. The piston assembly is slideable along the interior wall 58 from the rim 57 at the housing opening 56 to a depth D of the interior wall 58. Though closely received in the cross-section of the housing opening 56 of the canister housing 52, the damper piston assembly 70 is freely slideable along the depth D of the interior wall 58 in response to a difference in pressure across the piston assembly 70.

A stop ring 60 is fixable to the housing rim 57 at the housing opening 56 of the canister housing 52. The stop ring 60 is fixed to the housing rim 57 with stop ring fastening means 62; which are threaded fasteners in the illustrated embodiment. The piston stop ring 60 is adapted to retain the damper piston assembly 70 slideably within the canister housing 52. The further adaptation of the piston stop ring 60 is not obvious and is important because of the high-pressure and fluid suspension environment in which it operates. To use fracing fluid as a fluid suspension example, fracing fluid is not only abrasive (because it contains sand suspended in the fluid), the solids that form the suspension can and do settle-out on horizontal surfaces, accumulate like plaques, and can hinder/restrict travel of the piston. Therefore, the structural cross-section of the stop ring 60 and the features of its interface with the housing rim 57 and piston skirt 76 are adapted to avoid accumulating sand/sediment plaques. The canister housing 52, damper piston assembly 70 and stop ring 60 in combination are adapted to contain a gas in the housing interior space 54 at continuously varying pressures of up to 12,500 psi, to accomplish the present damper canister 50.

Figure 19:
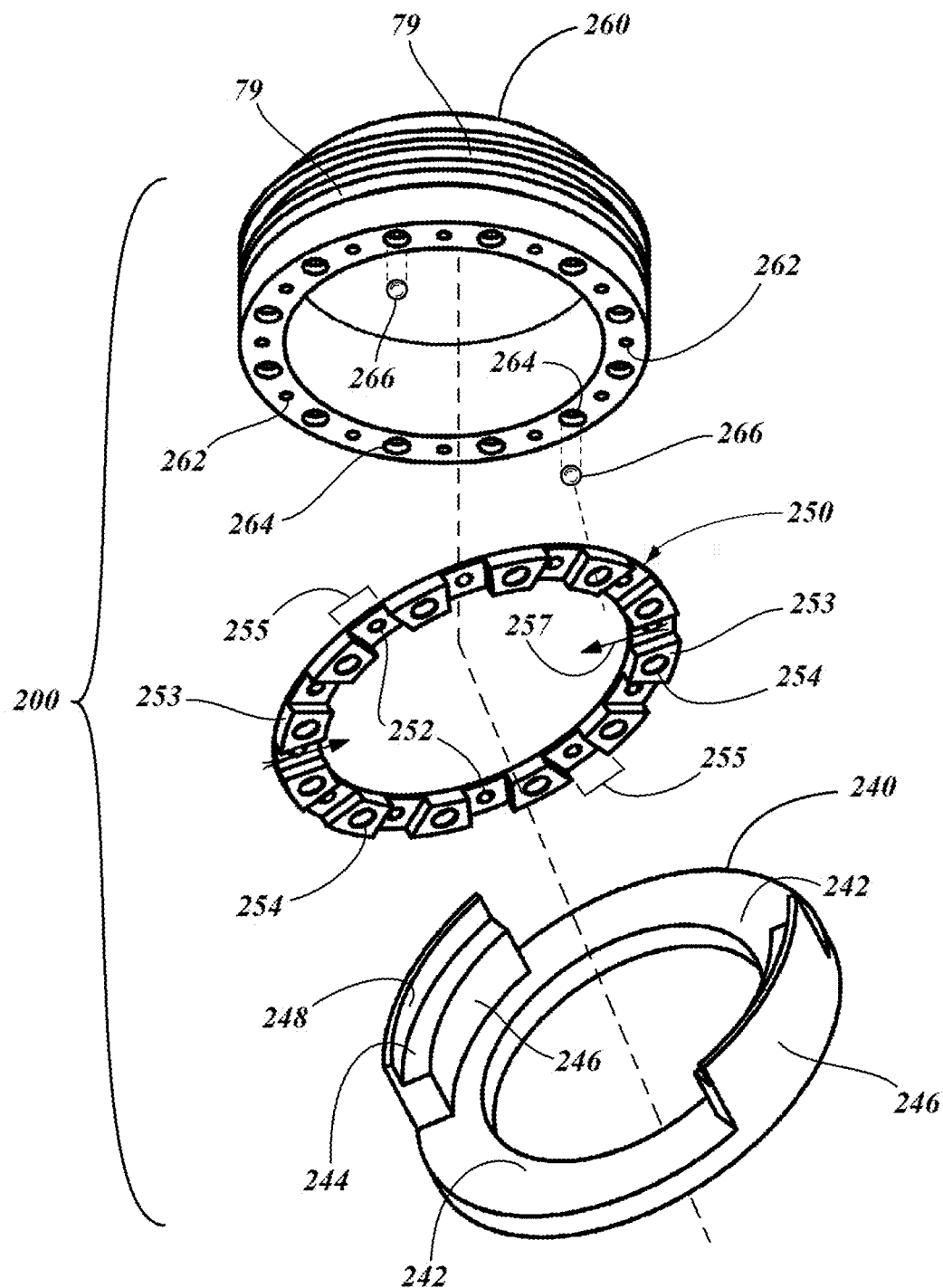
FIG. 19 is an exploded view of components the sediment management system of FIGS. 18A-18C.
Figure 20:
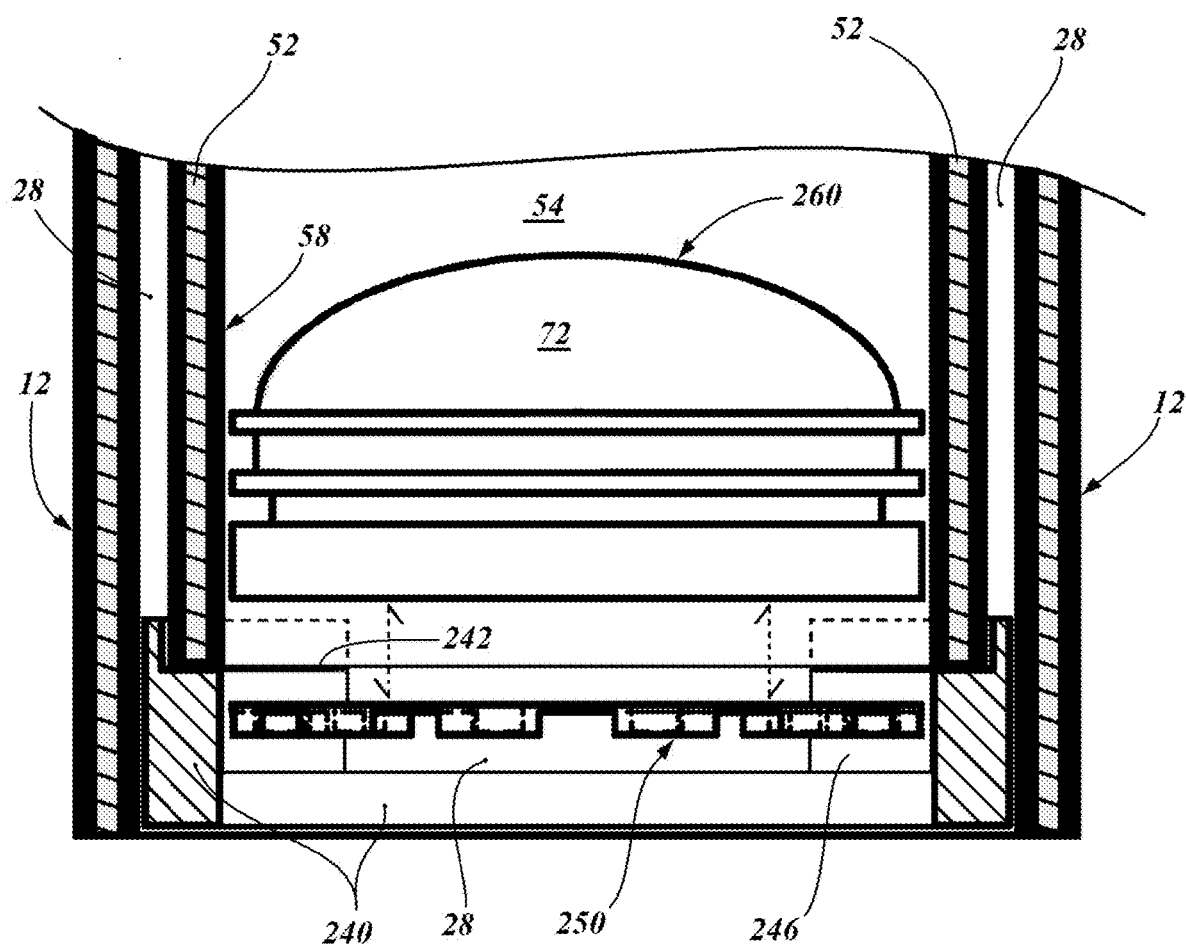
FIG. 20 is a cross-sectional/phantom view of the sediment management components of FIG. 19 showing their relative placement within the damper canister and dampener housing.

FIG. 19 and FIGS. 20 show the positioning relationship for: the piston assembly 260, the sediment management ring 250, the stop ring 240 and piston lug 246 of the stop ring 240. The piston assembly 260 (also see FIG. 5) comprises a damper piston 72 having a damper piston head 74 portion and a damper piston skirt 76 portion. The piston head 74 portion has a gas pressure surface 75$a$ and a fluid pressure surface 75$b$. The piston skirt 76 portion has at least one piston ring channel 79, within each of which a piston ring 82 (not shown in FIG. 19) is received. A first piston ring 82 is a gas/fluid sealing ring. A sealing type piston ring 82 is compressed by the ring channel 79 to form a slideable gas/fluid pressure seal between the piston skirt 76 and the interior wall 58 of the canister housing 52. Other rings may also be provided for sealing and/or particle wiping.

Additionally, the damper piston head 74 portion of the damper piston 72 has a gas port fitting 90. The gas port fitting 90 is adapted to provide a sealable through-port between the gas pressure surface 75$a$ and the fluid pressure surface 75$b$ of the piston head 74. The gas port fitting enables the housing interior space 54 to receive and contain a gas charge to bias the housing interior space 54 at an initial gas pressure. The gas port fitting 90 component of the damper piston 72 has a gas through-port 92 between the gas pressure surface 75$a$ and the fluid pressure surface 75$b$ of the piston head 74. A normally closed gas check valve 94 provides a means to charge the housing interior space 54 with a gas, such as nitrogen, and prevents the gas from escaping. A gas port cover 96 protects the gas valve 94 from the fluid at the fluid pressure surface 75$b$ of the piston head 74, and further seals the gas port fitting to prevent gas from leaking out of the canister housing 52. Although illustrated as a component of the damper piston 72 in FIGS. 4 & 5, the gas port fitting 90 may be disposed elsewhere on a damper canister 50 as selectable by on of skill in the art, see FIGS. 6A & 6B.

In an alternative embodiment for dampening pressure pulsations in a high-pressure fluid flow line/conduit, the pulsation dampener apparatus 10$a$ of the present invention can be configured as illustrated in FIG. 7 and FIG. 13. In this embodiment, the dampener housing 12$a$ is also a substantially cylindrical tube having a dampener interior fluid space 28 along an axis 15 of length L of the dampener housing 12$a$. The dampener housing 12$a$ has a first end 14$a$ open and a second end 14$c$ closed. The first end 14$a$ is shown in fluid pressure communication with the high-pressure fluid flow line 16 via flange members 33 & 34$a$ of a pipe union 30. See FIGS. 14A-14D for an example of a flow-through union flange member 34$a$. The second end 14$c$ is closed with a flange member 33 and a flange plate 34$b$. However, if desired the second end 14$c$ of the pulsation dampener apparatus 10$a$ may be connected to the fluid flow line 16 or in series to another pulsation dampener apparatus 10$a$ by replacing the flange plate 34$b$ with an appropriate flange member (e.g., 34$a$). Also see FIG. 8 and FIGS. 13A-13C.

As exemplified in FIGS. 9A-9D, a dampener housing 12$a$ contains at least one "tandem" damper gas canister 50$a$. The "tandem" feature of the damper gas canister 50$a$ derives from the gas canister 50$a$ housing two separate damper piston assemblies 70$a$. The gas canister 50$a$ has a canister axis 53, and one or more tandem damper gas canisters 50$a$ are received within the dampener housing 12$a$ with its canister axis 53 parallel to the housing axis 15. The damper gas canisters 50$a$ are in pressure communication with the interior fluid space 28 of the dampener housing 12$a$. The canister housing 52$a$ of a tandem damper gas canister 50$a$ is in the form of a high-pressure gas cylinder having a housing interior space 54 and a cross-sectional housing opening 56 at each end, and an interior wall 58. The interior wall 58 is adapted to slideably receive a damper piston assembly 70$a$ along a depth D of the interior wall 58.

A damper piston assembly 70$a$ is closely received within the cross-sectional opening 56 of each end of the canister housing 52$a$. In the embodiments illustrated, the damper piston assemblies 70$a$ are freely slideable along the depth D of the interior wall 58 of the canister housing 52$a$. As exemplified in FIGS. 10A-10D, the damper piston 72 of the piston assembly 70$a$ has a piston head 74 portion and a piston skirt 76 portion. The piston head 74 portion of the damper piston 72 has a gas pressure surface 75$a$ and a fluid pressure surface 75$b$. The piston skirt 76 portion has at least one piston ring channel 79. Piston ring channels each will contain a wiper ring 82. Wiper rings 82 are biased by the ring channel 79 to form a slideable gas/fluid pressure seal between the piston skirt 76 and the interior wall 58 of the canister housing 52$a$. The piston assembly 70$a$ is slideable in one direction or another within the canister housing 52$a$ in response to a sufficient pressure difference between the gas pressure within the canister interior space 54 and the fluid pressure of the fluid contained within the dampener housing interior fluid space 28 of said pulsation dampener apparatus 10$a$. That is, when there is a $\Delta_{Press}$ across the gas pressure surface 75$a$ and the fluid pressure surface 75$b$ of the piston head 74. The structure of the piston head 74 provides a pressure differential energized seal system substantially similar to that described for the piston head 74 of FIG. 5. Wherein, the deformation of the piston head 74 from the pressure differential across the piston head surfaces 75$a$ & 75$b$ causes the dome of the piston head 74 to flatten, thus further biasing the seal portion of the piston assembly radially and toward the canister wall 58, effecting an improved seal.

As illustrated in the figures, this embodiment of the damper piston head 74 portion of the damper piston 72 has a gas port fitting 90. Although illustrated as a component of the damper piston 72 in FIGS. 4 & 5, the gas port fitting 90 may be disposed elsewhere on a damper canister 50 as selectable by on of skill in the art, see FIGS. 6A & 6B. The gas port fitting 90 is adapted to provide a sealable through-port between the gas pressure surface 75$a$ and the fluid pressure surface 75$b$ of the piston head 74. The gas port fitting 90 is provided to enable the canister interior space 54 to receive and contain a gas charge to bias the canister interior space 54 at an initial gas pressure, e.g., at 4,000 psi. In the embodiment exemplified in FIGS. 10A-10D, the gas port fitting 90 is substantially the same as that depicted in FIG. 5.

Figure 4:
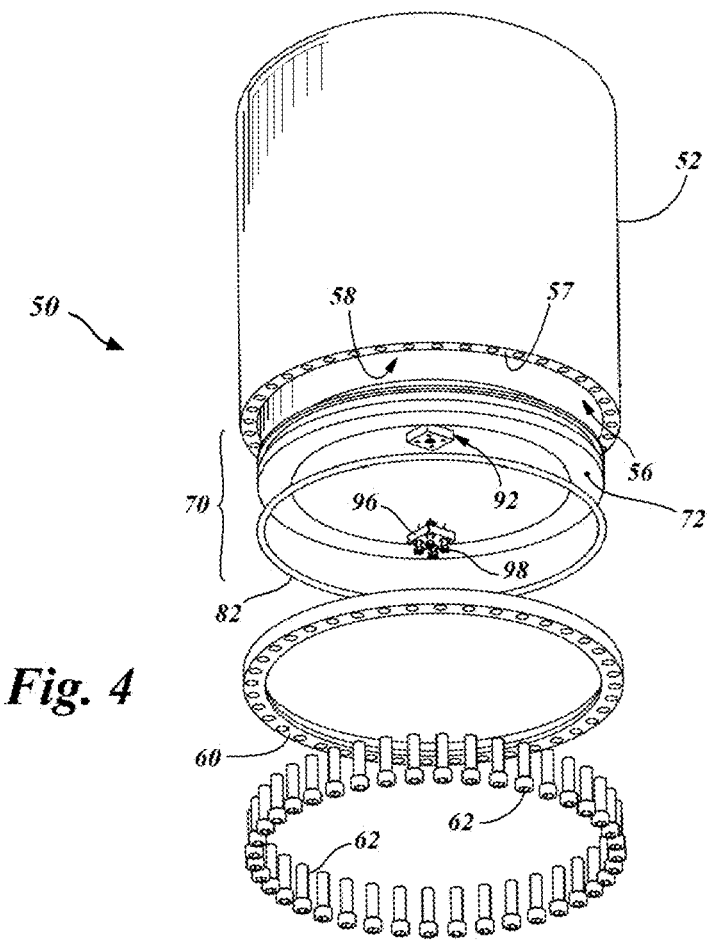
FIG. 4 is an exploded perspective view of components of a damper canister of the present high-pressure flow pulsation dampener.
Figure 5:
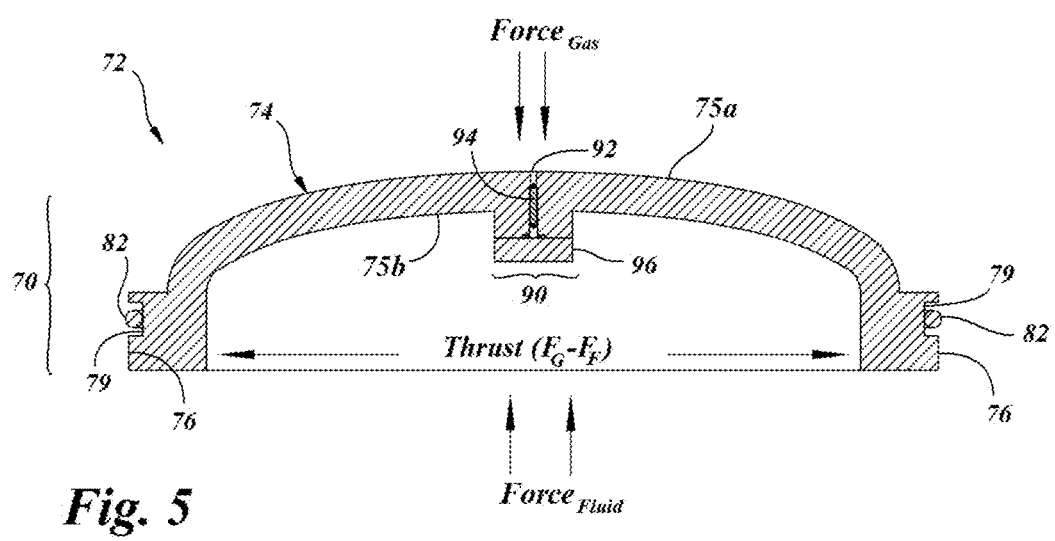
FIG. 5 is a side elevation cross-sectional schematic view of the piston assembly of the present high-pressure flow pulsation dampener.
Figure 8:
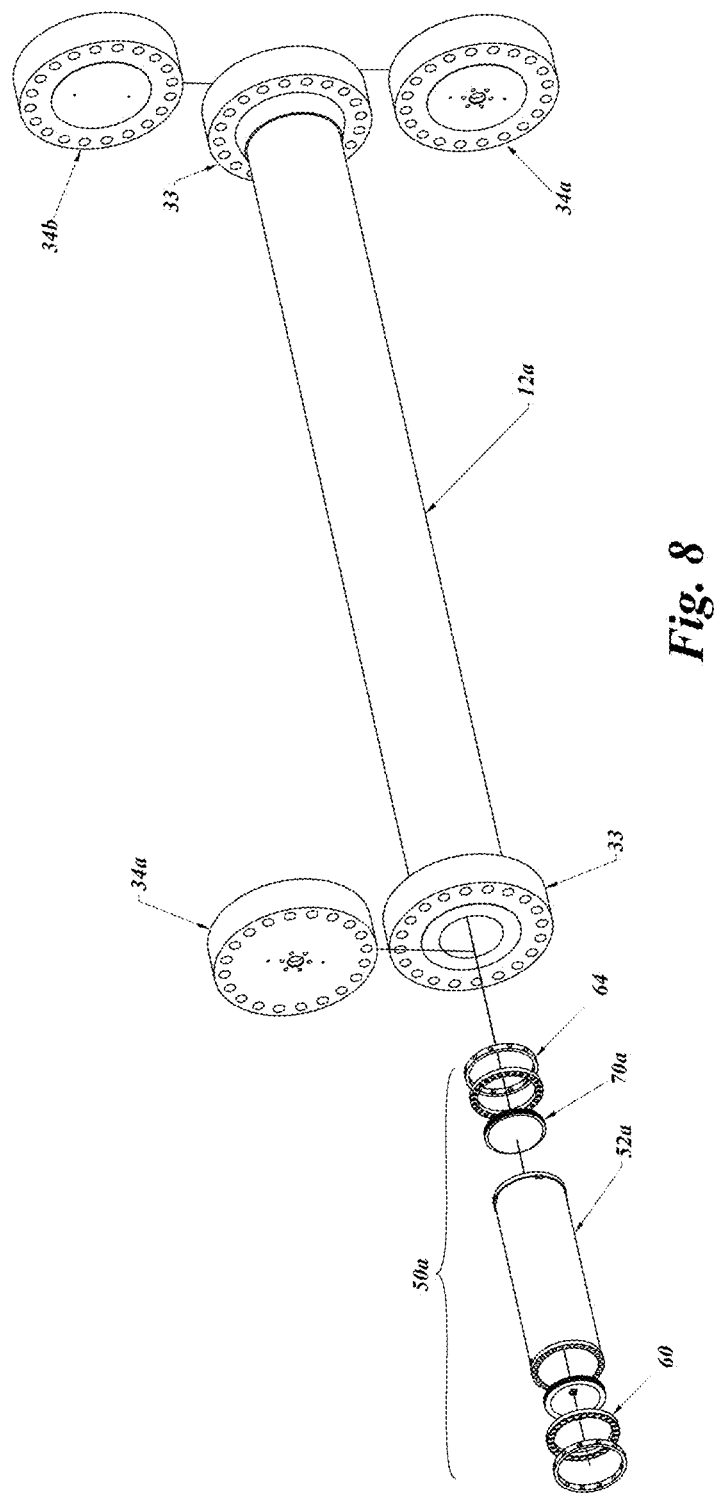
FIG. 8 is an exploded perspective view of the HP flow pulsation dampener apparatus of FIG. 7 showing a tandem damper canister in exploded view.
Figures 12A, 12B, 12C:
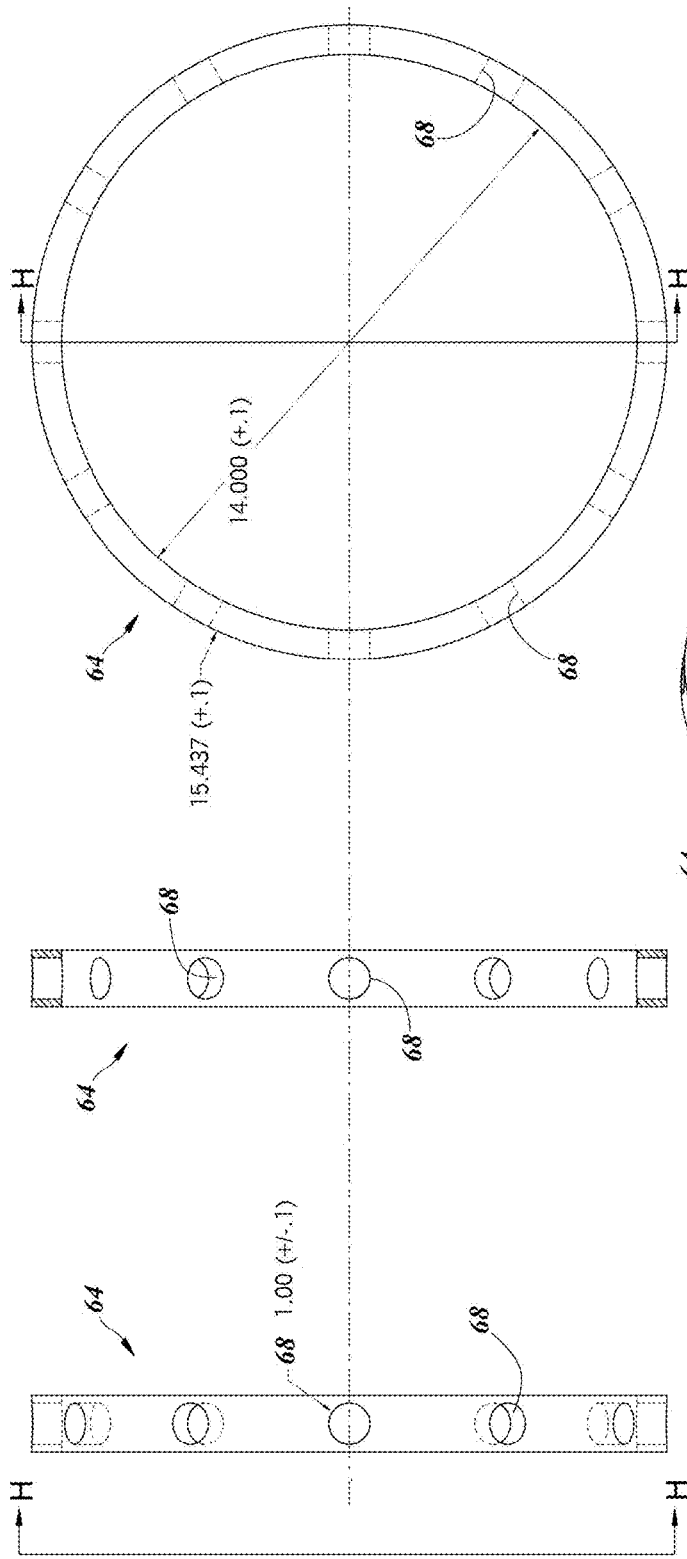
FIGS. 12A-12D are various view of a through-flow spacer ring for practice in the present apparatus.
Figure 12D:
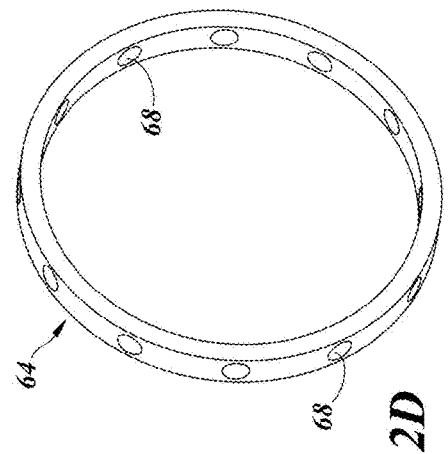

As shown in FIGS. 11A-11D, a stop ring 60 is fixable to the housing rim 57 at each housing opening 56, using such means as exemplified in FIG. 4, or by other means as selected by the skilled artisan and adapted to retain the damper piston assembly 70$a$ slideably within the canister housing 50. The canister housing 52a, damper piston assembly 70a and stop ring 60 in combination are adapted to contain a gas in the housing interior space 54 at continuously varying pressures up to 12,000 psi to provide the present damper canister 50a.

Figure 15:
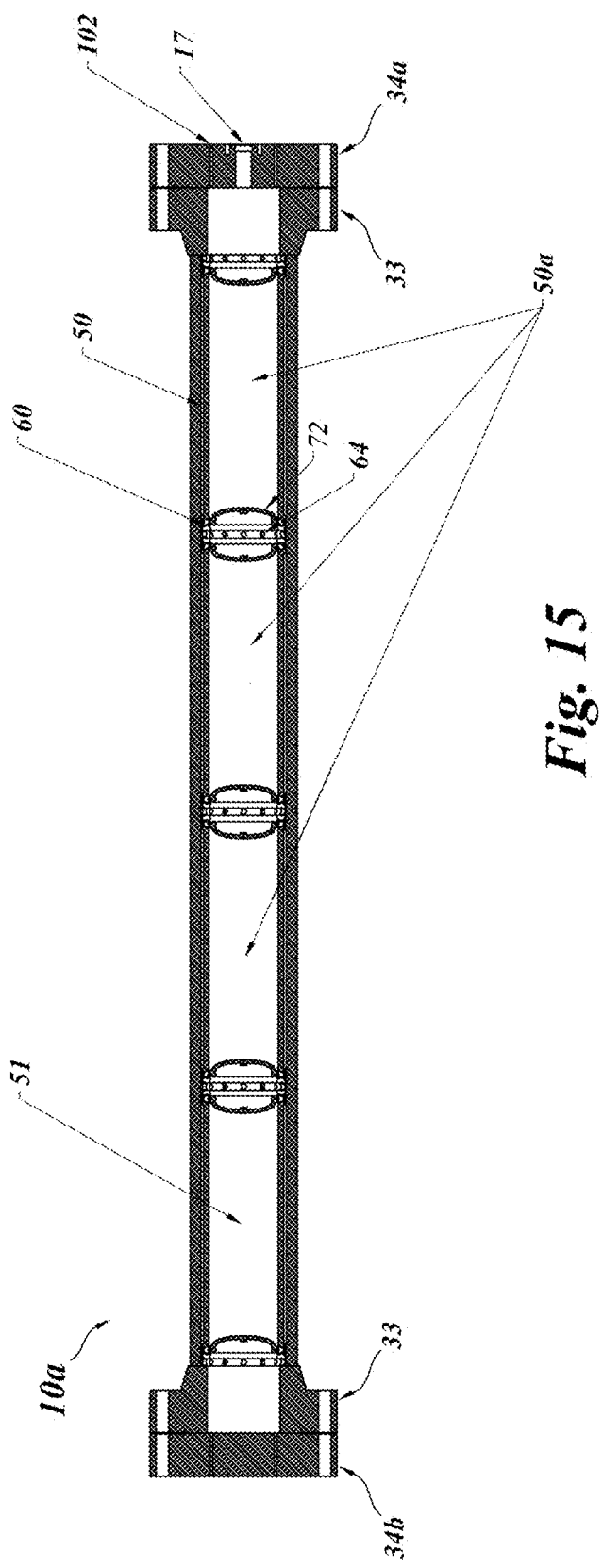
FIG. 15 is a cross-sectional view through a side elevation of a tandem damper canister HP flow pulsation dampener apparatus of FIG. 7.

As illustrated in FIG. 15, the present pressure pulsation dampener apparatus 10a is adapted to receive a plurality of tandem damper gas canisters 50a in series within the dampener housing 12a. In this embodiment, all of the tandem canister axes 53 are parallel (and coaxial) to the dampener housing axis 15. A through-flow spacer ring 64 (see FIGS. 12A-12D) is disposed between adjacent tandem damper gas canisters 50a. The through-flow spacer rings 64 enable fluid (from the high-pressure fluid flow line 16) to be communicated throughout the housing fluid space 28 of the dampener housing 12a, and thence to the piston fluid pressure surfaces 75b of the piston heads 74 between adjacent tandem damper gas canisters 50a.

Figures 16A, 16B:
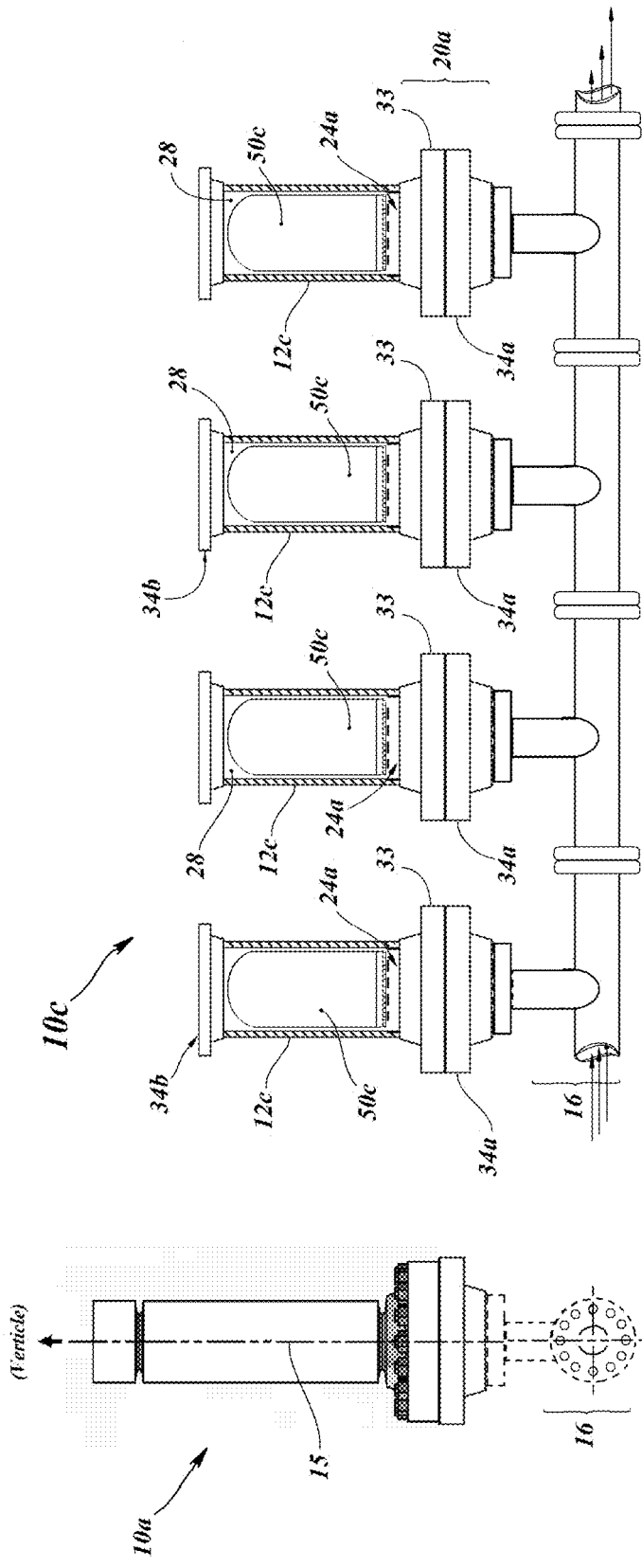
FIGS. 16A & 16B are partial cross-sectional (A) end view and (B) side elevation view of single canister dampener housings disposed in a series in a HP fluid flow line to accomplish the present HP flow pulsation dampener apparatus.

In another alternative embodiment exemplified in FIGS. 16A & 16B, the present pressure pulsation dampener apparatus 10a may be configured as a series of single canister dampener housings 12c disposed in a high-pressure fluid flow line 16 to accomplish the present invention (see 10c, FIG. 16B). The dampener housings 12c illustrated in FIGS. 16 A & B are similar to the dampener housing 12a disclosed in FIG. 7 and FIG. 8, but illustrated as adapted to contain a single damper 50c. Also, the damper canister 50c illustrated in FIG. 16 is similar to the damper canister 50 disclosed in FIG. 3 to FIG. 5. In the illustrated embodiment of the present pressure pulsation dampener apparatus 10c, the individual dampener housings 12c are disposed perpendicular and vertical (with the bottom facing down) relative to the flow path 16. Additionally illustrated is a non-flow fluid chamber 24a below the bottom of the damper canister 50c to ameliorate accumulating sand/sediment plaques by allowing excess sediment to settle through the non-flow fluid space and housing-to-flow line adapter 20a to be carried away when it reaches the fluid flow line 16.

Use Case

Additionally disclosed is a further embodiment of the present invention as illustrated in FIGS. 17 A to 17C. The description of this embodiment is to particularly disclose a sediment (sand) management feature practicable in non-flow-through applications of the present pulsation dampener system. The device illustrated is non-flow-through, high pressure fracing fluid pulsation dampener. The illustrated device is non-flow-through in that it communicates with the high-pressure fluid flow line 16 as an appendage to the flow line. The device 10a was constructed using single piston damper canister 50 and also designed to be operated in a vertical position (along its length L) with the housing-to-flow line adaptor 20 oriented downward, and above the fluid flow path 22.

Since the pressure above the piston is around 6000 psig before and during the pre-charging of the fluid flow line 16, the downward force on the piston is immense. Further, the close tolerances between the outside diameter of the piston assembly 260 and the canister interior wall 58 require a uniform loading of the piston 260 as it lands on the piston stop face 242 as the flow line pressure is reduced when the fracingfracing pumps are shut down. Accumulation of sediment at locations in the path of the piston's travel can threaten the integrity of piston operation. In view of the ongoing possibility of sedimentation (e.g., sand in fracing fluids), sediment management must be affirmatively accommodated in the design of high pressure pulsation dampeners used in the pumping of fluid suspensions. Since the present present dampener is not a flow-through device, but rather an appendage device, the dampener apparatus is expected to be exposed to a small amount of sand/sediment relative to full fluid flow exposure. The amount of potential sand/sediment exposure will be a function of the piston displacement volume during system pre-charging at fluid pressures above the canister pre-charge pressure.

Sediment Management

FIG. 19 and FIGS. 20 show the positioning relationship for: the piston assembly 260, the sediment management ring 250, the stop ring 240 and piston lug 246 of the stop ring 240. The piston assembly 260 (also see FIG. 5) comprises a damper piston 72 having a damper piston head 74 portion and a damper piston skirt 76 portion. The piston head 74 portion has a gas pressure surface 75a and a fluid pressure surface 75b. The piston skirt 76 portion has at least one piston ring channel 79, within each of which a piston ring 82 (not shown in FIG. 19) is received. A first piston ring 82 is a gas/fluid sealing ring. A sealing type piston ring 82 is compressed by the ring channel 79 to form a slideable gas/fluid pressure seal between the piston skirt 76 and the interior wall 58 of the canister housing 52. Other rings may also be provided for sealing and/or particle wiping.

FIG. 20 is a cross-sectional/phantom view of the sediment management components of FIG. 19 showing their relative placement within the damper canister and dampener housing. The sand/sediment management ring 250 of the sediment management system 200 is fixed to the piston assembly 260 and travels with the damper piston assembly 260 as it moves within the canister interior wall 58 in response to increasing/decreasing pressure and pulsations. The sand/sediment management ring 250 may be either closely fixed to the piston assembly 260, or loosely fixed—to more readily allow for expansion of the piston skirt 76 in response to a sufficient pressure difference across the damper piston head 72 (see FIG. 5).

FIGS. 18A-18C show the operational methodology whereby the accumulation of sediment is ameliorated and/or prevented. Using fracing fluid as an example, during pumping operations, sand in the fracing fluid at the piston fluid pressure surface 75b is exposed to the canister interior wall 58 and other surfaces in the bottom portion of the canister interior space 54. Any sand or other fluid suspension component that settles out of the fracing fluid and adheres to the canister interior wall 58 is pushed by the piston wiper seal (not shown) of the piston assembly 260 downward as the piston assembly descends during the depressurizing portion of the fracing process and pressure pulsations. The sediment management ring 20 in combination with the piston assembly 260 lands on the piston stop face 242 of the stop ring 240 via the stop point-contacts 266. Any sediment collecting on the horizontal surface of the piston stop face 242 is contacted and disrupted by the stop point-contacts 266 protruding below the stop ring 240 from the point-contact port 254 of the stop ring point-contact cover 253. Disrupted sediment is flushed from the horizontal surface of the piston stop face 242 via the sediment notches 255 in the stop ring 240 by fluid action caused by the piston assembly 160 as the sediment management ring 250 comes to rest on the piston stop face 242 of the stop ring 240. The disrupted sediment then flushes from the sediment notches 255 and settles due to gravity from the damper housing fluid space 28. Small sediment accumulations may remain on the piston stop face 242, but the plurality of single point-contacts 266 protruding from the sediment management ring 250 prevents disrupting piston travel as the points 266 (ball bearings in the shown embodiment) contact the piston stop face 242. This flushing process occurs whenever pressure in the fluid flow line 16 drops below the gas charging pressure of the damper canister 50.

Attached as an Appendix is an engineering & design report exemplifying materials and design considerations for various embodiments of the present invention. The report is included herein by reference.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A high-pressure fluid pulsation dampener apparatus (10) for use on a suspension fluid flow line (16) to reduce pulsation pressures in a flow path (22) of a suspension fluid, the dampener apparatus comprising:
    a dampener housing (12), the dampener housing (12) substantially being an elongated pipe having two ends (14) a first-end (14*a*) and a second-end (14*b*), and internally having a non-flow fluid chamber (24) along a length (L) of the dampener housing (12), the dampener housing (12) to be oriented vertically in pressure communication with the fluid flow line (16);
    an integral pressure damper canister (50) disposed within the non-flow fluid chamber (24) of the dampener housing (12), the damper canister (50) having a damper piston assembly (70) received in the damper canister (50) in pressure communication with the fluid flow path (22) with the piston assembly (70) having a damper piston (72) disposed to move vertically to compress a gas above and within the damper canister (50) and the damper canister (50) being gas pressure chargeable above the piston to around 6000 psig, and adapted to dampen a portion of a pressure change of the suspension fluid in the fluid flow thru-path (22);
    a sediment management system (200) to ameliorate sediment accumulation within the dampener housing fluid space (28) and flushing it out a damper canister opening (56); and
    these elements and features in combination providing said pressure pulsation dampener apparatus (10) to be connected vertically as an appendage to said suspension fluid flow line (16) to reduce pulsation pressures in the flow path (22).

2. The pressure pulsation dampener apparatus (10) of claim 1, wherein the sediment management system (200) substantially consists of:
    a damper piston assembly (260), the piston assembly (260) having a sediment ring interface (261) for interfacing with a sediment management ring (250), the ring interface (261) having disposed on it a plurality of fastener receivers (262) each adapted for receiving a fastener, and a plurality of stop point-contact receivers (264) each adapted for receiving a stop point-contact (266);
    the sediment management ring (250) having a plurality of fastener ports (252) disposed for passing a fastener to a fastener receiver (262) to fix the sediment ring (250) to the ring interface (261) of the piston assembly (260), and having point-contact ports (254) adapted to retain the stop point-contacts (266) in the stop point-contact receivers (264) while allowing the stop point-contacts (266) to protrude from the point-contact ports (254); and
    a stop ring (240) having a piston stop face (242) upon which the point-contacts (266) land when the damper piston assembly (260) is descended in the pressure damper canister (50).

3. The pulsation dampener apparatus (10) of claim 1 for dampening pressure pulses in a high-pressure fluid flow line (16), wherein the fluid is a fracing fluid.

4. The pulsation dampener apparatus (10) of claim 1, wherein the integral pressure damper canister (50) comprises:
    a canister housing (52) in the form of a high-pressure gas cylinder, the canister housing (52) being an open tube having a housing interior space (54) and a cross-sectional housing opening (56) at one end, an interior wall (58) adapted to slideably receive a piston assembly (70) along a depth (D) of the interior wall (58), and having at another end an end cap (284) in common with the dampener housing (12);
    a damper piston assembly (70) is closely received in the cross-sectional opening (56) of the canister housing (52), the piston assembly (70) is freely slideable vertically along the depth (D) of the interior wall (58) to compress the gas above and within the interior space (54) of the canister housing (52) and to avoid accumulating sediment materials, and having a damper piston head (74) adapted to provide a pressure differential energized seal with a canister interior wall (58);
    a stop ring (60) is fixable to a housing rim (57) at the housing opening (56) with a stop ring fastening means (62), the stop ring (60) having features of its interface with the housing rim (57) and piston skirt (76) adapted to avoid sand and/or sediment accumulation, and adapted to retain the damper piston assembly (70) slideably within the canister housing (52), and the canister housing (52), damper piston assembly (70) and stop ring (60) in combination adapted to contain a gas in the housing interior space (54) at continuously varying pressures up to 12,000 psi to provide said damper canister (50); and
    the damper canister (50) in use being in an up-down orientation with its depth (D) substantially perpendicular to the high-pressure fluid flow line (16), these elements and features in combination providing said damper canister (50) for use in a pulsation dampener apparatus (10) for dampening fluid pressure pulses in a high pressure fluid flow line.

5. The damper canister (50) of claim 4, wherein the piston assembly (70) comprises:
    a damper piston (72) having a damper piston head (74) portion and a damper piston skirt (76) portion;
    the piston head (74) portion having gas pressure surface (75*a*) and a fluid pressure surface (75*b*);
    the piston skirt (76) portion, having a piston ring channel (79) within which a wiper ring (82) is received;
    the wiper ring (82) being biased by the ring channel (79) to form a slideable gas/fluid pressure seal between the piston skirt (76) and the interior wall (58) of the canister housing (52); and
    the piston assembly (70) being slideable within the canister housing (52) in response to a sufficient positive pressure difference between a gas pressure within the canister interior space (54) and a fluid pressure of a fluid flow thru-path (22) of said pulsation dampener apparatus (10).

6. The piston assembly (70) of claim 5 wherein a structure of the damper piston (72) provides a pressure differential energized seal system designed to maintain a constant clearance between the piston assembly (70) and the canister wall, with the deformation of the piston from the internal gas pressure causes the piston assembly (70) to flatten, thus further biasing the seal portion of the piston assembly radially and toward the canister wall, effecting an improved seal.

7. The integral pressure damper canister (50) of claim 4, wherein the end cap (284) further comprises having a gas port fitting (90) adapted to provide a sealable through-port to enable the housing interior space (54) to receive and contain a gas charge to bias the housing interior space (54) at an initial gas pressure.

\* \* \* \* \*